United States Patent
Chien

(10) Patent No.: US 11,777,657 B2
(45) Date of Patent: Oct. 3, 2023

(54) USER EQUIPMENT AND BASE STATION FOR MOBILE COMMUNICATION SYSTEM

(71) Applicant: Institute For Information Industry, Taipei (TW)

(72) Inventor: Chun-Che Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 402 days.

(21) Appl. No.: 16/920,680

(22) Filed: Jul. 4, 2020

(65) Prior Publication Data
US 2021/0021382 A1 Jan. 21, 2021

Related U.S. Application Data

(60) Provisional application No. 62/875,954, filed on Jul. 18, 2019.

(51) Int. Cl.
*H04L 1/1812* (2023.01)
*H04L 5/00* (2006.01)
*H04W 72/21* (2023.01)
*H04W 72/23* (2023.01)

(52) U.S. Cl.
CPC .......... *H04L 1/1812* (2013.01); *H04L 5/001* (2013.01); *H04W 72/21* (2023.01); *H04W 72/23* (2023.01)

(58) Field of Classification Search
CPC ..... H04L 1/1812; H04L 5/001; H04L 1/1858; H04L 1/1861; H04L 5/0055; H04W 72/0413; H04W 72/042; H04W 72/1273; H04W 72/0406; H04W 72/1289
See application file for complete search history.

(56) References Cited

U.S. PATENT DOCUMENTS

| | | | | |
|---|---|---|---|---|
| 9,913,261 | B2* | 3/2018 | Lee | H04W 72/042 |
| 10,993,141 | B2* | 4/2021 | Huang | H04W 28/04 |
| 2020/0213981 | A1* | 7/2020 | Park | H04L 1/1861 |

(Continued)

FOREIGN PATENT DOCUMENTS

WO 2017160350 A1 9/2017

OTHER PUBLICATIONS

Office Action to the corresponding Taiwan Patent Application rendered by the Taiwan Intellectual Property Office (TIPO) dated Apr. 23, 2021, 51 pages (including English translation).

(Continued)

*Primary Examiner* — Ayaz R Sheikh
*Assistant Examiner* — Tarell A Hampton
(74) *Attorney, Agent, or Firm* — Skaar Ulbrich Macari, P.A.

(57) ABSTRACT

A user equipment (UE) and a base station (BS) are provided. The UE monitors a plurality of semi-persistent scheduling (SPS) physical downlink shared channel (PDSCH) resources, and determines an SPS Hybrid Automatic Repeat reQuest acknowledge (HARQ-ACK) bit order of a plurality of SPS HARQ-ACK bits, corresponding to the SPS PDSCH resources, in a codebook according to a time-domain position, a component carrier index and a configuration index of each SPS PDSCH resource. Afterwards, the UE generates an HARQ-ACK message including the codebook according to the SPS HARQ-ACK bit order, and transmits the HARQ-ACK message on a physical uplink control channel (PUCCH) resource to the BS.

18 Claims, 32 Drawing Sheets

(56) References Cited

U.S. PATENT DOCUMENTS

| | | | |
|---|---|---|---|
| 2020/0228231 A1* | 7/2020 | Fan | H04B 7/0621 |
| 2020/0228248 A1* | 7/2020 | Islam | H04L 1/1861 |
| 2020/0252168 A1* | 8/2020 | Kim | H04L 1/1819 |
| 2021/0050948 A1* | 2/2021 | Gao | H04W 72/0413 |
| 2021/0250130 A1* | 8/2021 | Lei | H04L 1/1816 |
| 2021/0314095 A1* | 10/2021 | Gao | H04L 5/0055 |
| 2022/0095337 A1* | 3/2022 | Wang | H04L 1/1861 |
| 2022/0103292 A1* | 3/2022 | Hwang | H04W 72/0406 |
| 2022/0104231 A1* | 3/2022 | Gou | H04L 1/0003 |
| 2022/0159692 A1* | 5/2022 | Lee | H04W 76/30 |
| 2022/0174693 A1* | 6/2022 | Takeda | H04W 72/1278 |
| 2022/0200835 A1* | 6/2022 | Shi | H04L 27/26025 |

OTHER PUBLICATIONS

3GPP TS 38.213 V15.6.0; Technical Specification Group Radio Access Network; NR; Physical layer procedures for control (Release 15), Jun. 24, 2019, 107 pages.

3GPP TSG-RAN WG1; Scheduling/HARQ Enhancements for NR URLLC; Meeting #96bis; Tdoc R1-1904125; Xi'an, China, Apr. 8-12, 2019, 11 pages.

3GPP TSG RAN WG1; Enhancements for DL SPS configurations; #96bis; R1-1904150; Xi'an, China; Apr. 8-12, 2019, 4 pages.

* cited by examiner

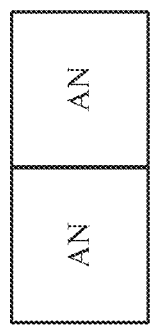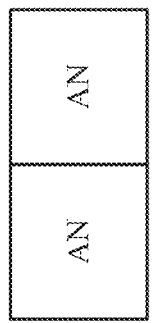
FIG. 2E
FIG. 2F

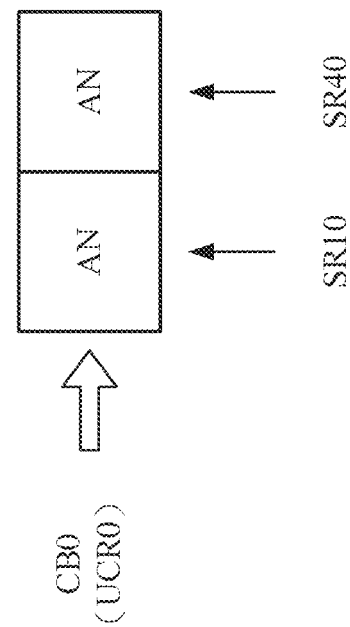

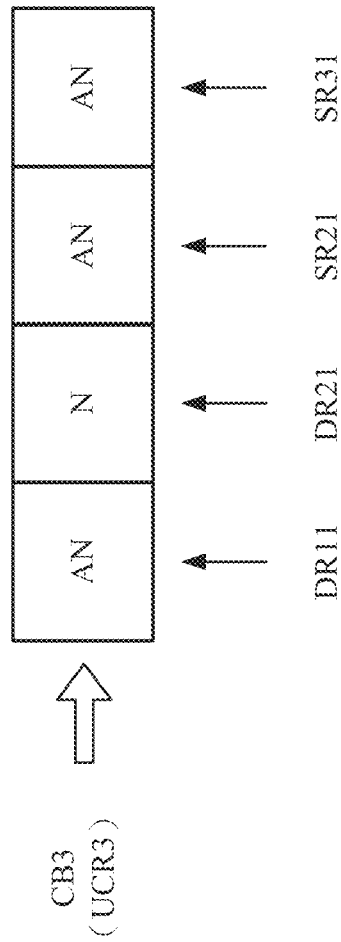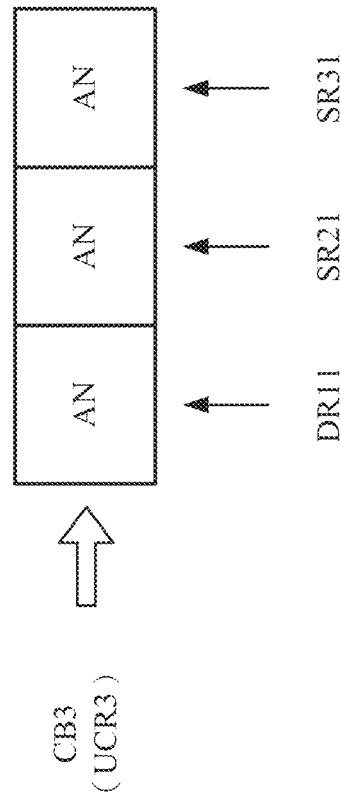

USER EQUIPMENT AND BASE STATION FOR MOBILE COMMUNICATION SYSTEM

PRIORITY

This application claims the benefit of priority based on U.S. Patent Application No. 62/875,954, filed on Jul. 18, 2019, the disclosures of which are incorporated by reference herein in their entirety.

FIELD

The present invention relates to a user equipment and a base station for a mobile communication system. Specifically, the user equipment of the present invention determines a Semi-Persistent Scheduling (SPS) bit order of a plurality of SPS Hybrid Automatic Repeat reQuest acknowledge (HARQ-ACK) bit values of a plurality of SPS Physical Downlink Shared Channel (PDSCH) resources in a codebook according to a time-domain position, a component carrier (CC) index, and a configuration index corresponding to each of the SPS PDSCH resources.

BACKGROUND

With the rapid growth of wireless communication technology, various applications of wireless communication have been ubiquitous in people's life, and people's demands for wireless communication are also increasing day by day. In order to satisfy various applications in life, the next generation of mobile communication system (which is commonly called a 5G mobile communication system currently) proposes new service types, e.g., Ultra-reliable and Low Latency communication (URLLC), Enhanced Mobile Broadband (eMBB) communication, Massive Machine Type Communications (mMTC). In these service types, the URLLC service type is to meet transmission requirements of low delay and reliability, so the URLLC service is quite suitable for vehicle communication or industrial communication. In the planning of the current 5G mobile communication system, for a plurality of downlink data signals transmitted on multiple Physical Downlink Shared Channel (PDSCH) resources, a base station will configure a Physical Uplink Control Channel (PUCCH) resource in a slot for use by a user equipment to transmit a Hybrid Automatic Repeat reQuest acknowledge (HARQ-ACK) message to provide feedback on whether these downlink data signals are correctly received.

In response to the development of the 5G mobile communication system, academia and industries have currently begun to discuss whether the 5G mobile communication system can be enabled to support more types of Industry Internet of Things (Industry IoT) devices. For example, the traditional industrial communication adopts a time sensitive networking (TSN) communication standard, which is based on Ethernet for signal transmission. If a TSN system is integrated into the 5G mobile communication system (i.e., 5G time sensitive communication (TSC)), then devices of the TSN system may be made into Industry IoT devices so that mutual communication between these devices can be achieved through the 5G mobile communication system, especially the communication between the central control device of the TSN system and industrial operation devices distributed to various places.

There are many kinds of devices in the TSN system, which mainly include mechanical arms, industrial control machines or the like. Since these devices have mutual operation requirements and the transmissions are mostly periodic, the base station needs to configure semi-persistent scheduling (SPS) PDSCH resources for use by these Industry IoT devices if these devices are integrated into the 5G mobile communication system, and according to different applications, it is necessary to have multiple groups of SPS PDSCH resource configurations to meet requirements of different traffic types or to shorten the latency. However, for the downlink data signals transmitted on these SPS PDSCH resources, the 5G mobile communication system has not yet specified exactly how to organize the codebook in the HARQ-ACK message so as to achieve the purpose of providing feedback on the downlink reception correctness on the corresponding SPS PDSCH resources, i.e., how to determine the order of the HARQ-ACK bits of the corresponding SPS PDSCH resources in the codebook.

Accordingly, there is an urgent need in the art for a codebook HARQ-ACK bit order mechanism for SPS PDSCH resources, to provide feedback on the downlink reception correctness on the corresponding SPS PDSCH resources.

SUMMARY

An objective herein is to provide a codebook HARQ-ACK bit order mechanism for SPS PDSCH resources, which determines an SPS bit order of a plurality of SPS HARQ-ACK bit values of the SPS PDSCH resources in a codebook according to a time-domain position, a component carrier index, and a configuration index corresponding to each of the SPS PDSCH resources. Accordingly, the codebook HARQ-ACK bit order mechanism can enable the user equipment to feed the downlink reception correctness on the corresponding SPS PDSCH resources back to the base station.

The disclosure includes a user equipment for a mobile communication system, which comprises a transceiver and a processor. The processor is electrically connected to the transceiver, and is configured to perform the following operations: monitoring a plurality of Semi-Persistent Scheduling (SPS) Physical Downlink Shared Channel (PDSCH) resources through the transceiver, each of the SPS PDSCH resources being not a periodic resource indicated by a piece of downlink control information (DCI), and each of the SPS PDSCH resources being defined by at least one set of resource configuration parameters; determining an SPS Hybrid Automatic Repeat reQuest acknowledge (HARQ-ACK) bit order of a plurality of SPS HARQ-ACK bits, corresponding to the SPS PDSCH resources, in a codebook according to a time-domain position, a component carrier (CC) index, and a configuration index corresponding to each of the SPS PDSCH resources, each of the SPS HARQ-ACK bits being configured to indicate downlink reception correctness on the corresponding SPS PDSCH resource; generating an HARQ-ACK message comprising the codebook according to the SPS HARQ-ACK bit order; and transmitting, through the transceiver, the HARQ-ACK message on a Physical Uplink Control Channel (PUCCH) resource to a base station.

The disclosure also includes a base station for a mobile communication system, which comprises a transceiver and a processor. The processor is electrically connected to the transceiver, and is configured to perform the following operations: transmitting a plurality of downlink data signals on a plurality of Semi-Persistent Scheduling (SPS) Physical Downlink Shared Channel (PDSCH) resources through the transceiver, each of the SPS PDSCH resources being not a periodic resource indicated by a piece of downlink control information (DCI), and each of the SPS PDSCH resources being defined by at least one set of resource configuration parameters; and receiving, through the transceiver, a Hybrid Automatic Repeat reQuest acknowledge (HARQ-ACK) message on a Physical Uplink Control Channel (PUCCH) resource from a user equipment, wherein the HARQ-ACK message comprises a codebook.

The codebook is generated by the user equipment according to an SPS HARQ-ACK bit order of a plurality of SPS HARQ-ACK bits in a codebook, the SPS HARQ-ACK bit order is determined by the user equipment according to a time-domain position, a component carrier (CC) index, and a configuration index corresponding to each of the SPS PDSCH resources, and each of the HARQ-ACK bits is configured to indicate downlink reception correctness on the corresponding PDSCH resource.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 2E depicts a codebook transmitted on the PUCCH resource UCR0 of the present invention;

FIG. 2F depicts a codebook transmitted on the PUCCH resource UCR1 of the present invention;

FIG. 4B depicts a codebook transmitted on the PUCCH resource UCR0 of the present invention;

FIG. 4F depicts a codebook of a semi-static codebook type transmitted on the PUCCH resource UCR3 of the present invention;

FIG. 4G depicts a codebook of a dynamic codebook type transmitted on the PUCCH resource UCR3 of the present invention;

DETAILED DESCRIPTION

In the following description, the present invention will be explained with reference to certain example embodiments thereof. These example are not intended to limit the present invention to any specific environment, example, embodiment, applications, or implementations described in these example embodiments. Therefore, description of these example embodiments is only for purpose of illustration rather than to limit the present invention.

Please note that in the following embodiments and the attached drawings, elements unrelated to the present invention are omitted from depiction. Furthermore, dimensional proportions among individual elements in the attached drawings are provided only for ease of understanding, but not to limit the actual scale.

Figure 1A:
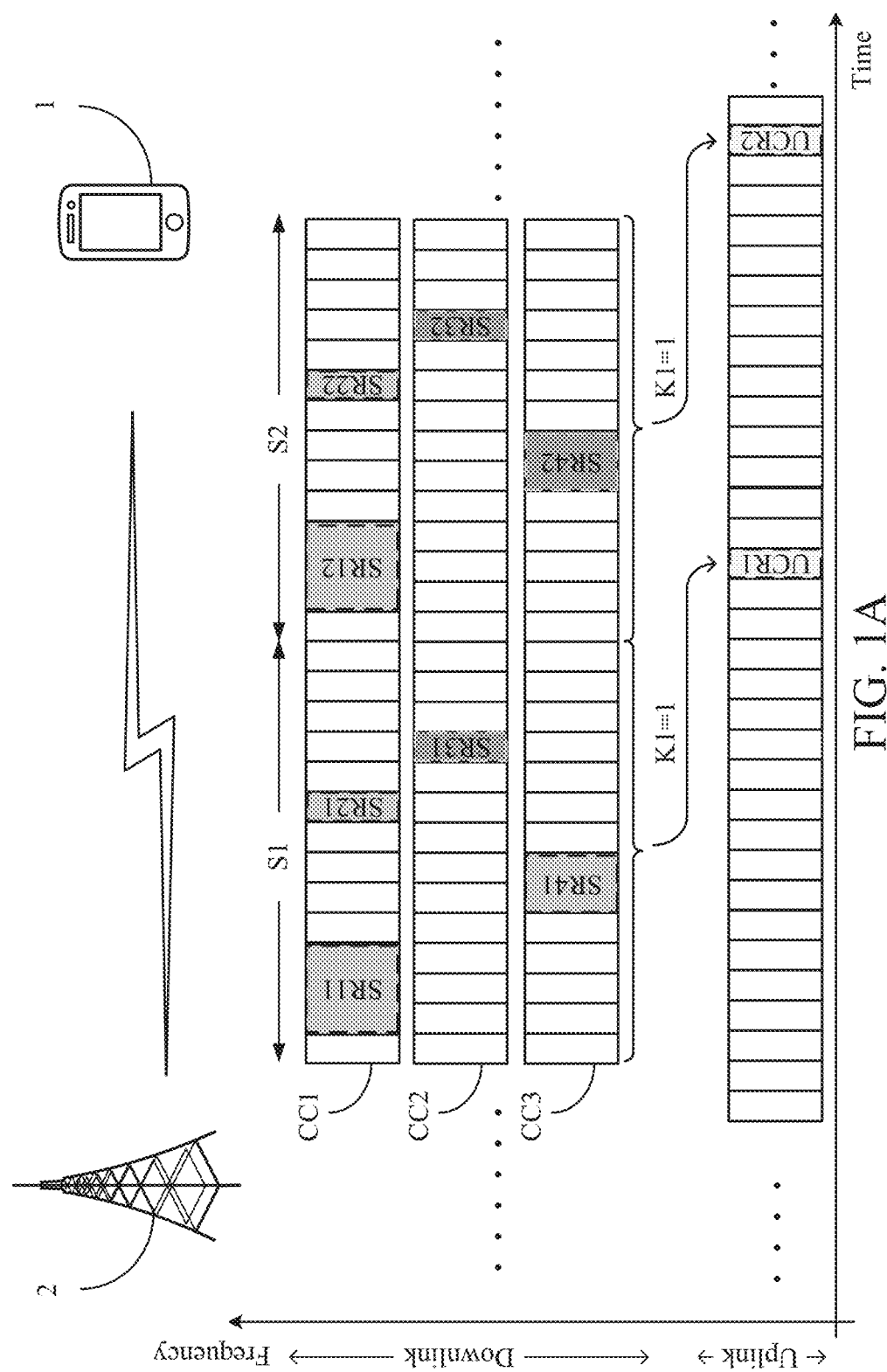
FIG. 1A depicts an implementation scenario of SPS PDSCH resource configuration of the present invention.
Figure 1B:
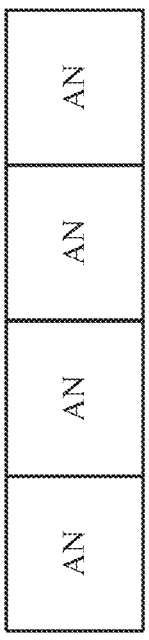
FIG. 1B depicts a codebook transmitted on a PUCCH resource UCR1 of the present invention.
Figure 1C:
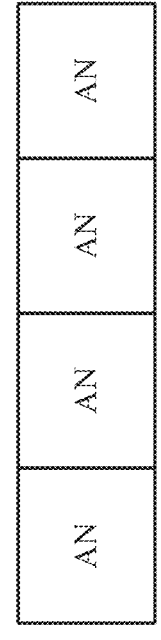
FIG. 1C depicts a codebook transmitted on a PUCCH resource UCR2 of the present invention.

A first embodiment of the present invention is shown in FIG. 1A to FIG. 1C. In this embodiment, in order to simplify the explanation, only the implementation scenario between a base station 2 and a single user equipment 1 is provided for illustration, to describe how the user equipment 1 feeds the downlink reception correctness on the corresponding Semi-Persistent Scheduling (SPS) Physical Downlink Shared Channel (PDSCH) resources back to the base station 2. Elements of the user equipment 1 and the base station 2 as well as functions of these elements will be further described in embodiments corresponding to FIG. 9 and FIG. 10 respectively. As shall be appreciated by those of ordinary skill in the art based on the following description, the present invention may also comprise other base stations and other user equipments in other implementation scenarios, and these base stations and user equipments can perform the same operations therebetween as those between the user equipment 1 and the base station 2 to achieve the purpose of providing feedback on the downlink reception correctness on the corresponding SPS PDSCH resources, and this will not be further described herein.

The base station 2 is adapted for use in a mobile communication system, which may be a next generation of mobile communication system (which is widely referred to as a 5G mobile communication system currently) or any mobile communication system based on the Orthogonal Frequency Division Multiple Access (OFDMA) technology. The following description takes a 5G mobile communication system as an example for illustration; however, how to extend the technical means of the present invention to other mobile communication systems based on the OFDMA technology shall be appreciated by those of ordinary skill in the art, and thus will not be further described herein.

The base station 2 transmits a plurality of downlink data signals on a plurality of SPS PDSCH resources. The user equipment 1 monitors the SPS PDSCH resources configured by the base station 2. The SPS PDSCH resources are defined by at least one set of resource configuration parameters, and the at least one set of resource configuration parameters may be configured in advance by the base station 2 through a radio resource control (RRC) message. In this embodiment, the SPS PDSCH resources are of periodicity and are not activated SPS PDSCH resources, i.e., each SPS PDSCH resource is not indicated by the downlink control information (DCI) like the activated SPS PDSCH resources. The user equipment 1 determines an SPS HARQ-ACK bit order of a plurality of SPS HARQ-ACK bits, corresponding to the SPS PDSCH resources, in a codebook according to a time-domain position, a component carrier (CC) index, and a configuration index corresponding to each of the SPS PDSCH resources. Each of the SPS HARQ-ACK bits is configured to indicate downlink reception correctness on the corresponding SPS PDSCH resource.

Please refer to FIG. 1A to FIG. 1B for an example. FIG. 1A depicts an implementation scenario of SPS PDSCH resource configuration according to the present invention. In FIG. 1A, the component carrier index (e.g., 1) of a component carrier CC1 is smaller than the component carrier index (e.g., 2) of a component carrier CC2, and the component carrier index of the component carrier CC2 is smaller than the component carrier index (e.g., 3) of a component carrier CC3. SPS PDSCH resources SR11 and SR12 with a configuration index of 1 and SPS PDSCH resources SR21 and SR22 with a configuration index of 2 are located on the component carrier CC1, SPS PDSCH resources SR31 and SR32 with a configuration index of 3 are located on the component carrier CC2, and SPS PDSCH resources SR41 and SR42 with a configuration index of 4 are located on the component carrier CC3. Herein, the SPS PDSCH resources with the same configuration indexes belong to the same group of SPS PDSCH resources.

The user equipment 1 needs to consider the component carrier index, the configuration index, and the time-domain position in sequence when determining the SPS HARQ-ACK bit order of SPS HARQ-ACK bits of the SPS PDSCH resources SR11, SR12, SR21, SR22, SR31, SR32, SR41, SR42 in the codebook. In detail, the base station 2 may instruct the user equipment 1 to provide feedback in units of one slot and feedback on a Physical Uplink Control Channel (PUCCH) source in the next slot through the downlink control information (DCI) describing the activated SPS PDSCH resource corresponding to each SPS PDSCH resource (e.g. a HARQ feedback timing indicator K1 carried by the DCI). In this case, for the SPS HARQ-ACK bits of the SPS PDSCH resources in the slot S1 in the codebook CB1, the user equipment 1 first schedules the SPS HARQ-ACK bit of the SPS PDSCH resource SR11 with the configuration index of 1 on the component carrier CC1 with the smallest component carrier index into the codebook CB1, and then schedules the SPS HARQ-ACK bit of the SPS PDSCH resource SR21 with the configuration index of 2 on the component carrier CC1 in the slot S1 into the codebook CB1.

When the SPS HARQ-ACK bits of all the SPS PDSCH resources SR11 and SR21 on the component carrier CC1 in the slot S1 have been scheduled into the codebook CB1, the user equipment 1 then schedules the SPS HARQ-ACK bit of the SPS PDSCH resource with the smallest configuration index on the component carrier CC2 (i.e., the SPS PDSCH resource SR31 with the configuration index of 3) into the codebook CB1. When the SPS HARQ-ACK bit of all the SPS PDSCH resource SR31 on the component carrier CC2 in the slot S1 has been scheduled into the codebook CB1, the user equipment 1 then schedules the SPS HARQ-ACK bit corresponding to the SPS PDSCH resource with the smallest configuration index on the component carrier CC3 in the slot S1 (i.e., the SPS PDSCH resource SR41 with the configuration index of 4) into the codebook CB1.

Therefore, the order of the SPS HARQ-ACK bits of the SPS PDSCH resources SR11, SR21, SR31, and SR41 in the slot S1 in the codebook CB1 may be as shown in FIG. 1B.

After determining the SPS HARQ-ACK bit order of the SPS HARQ-ACK bits of the SPS PDSCH resources SR11, SR21, SR31, and SR41 in the slot S1 in the codebook CB1, the user equipment 1 generates an HARQ-ACK message comprising the codebook CB1 according to the SPS HARQ-ACK bit order, and transmits the HARQ-ACK message on the Physical Uplink Control Channel (PUCCH) resource UCR1 to the base station 2.

Please refer to FIG. 1A and FIG. 1C for another example. When the user equipment 1 intends to provide feedback on the downlink reception correctness on the SPS PDSCH resources SR12, SR22, SR32, and SR42 in the slot S2 through the codebook CB2, it is also necessary to determine the SPS HARQ-ACK bit order of the SPS HARQ-ACK bits in the codebook CB2 by sequentially taking the slot, the component carrier index, the configuration index, and the time-domain position into consideration. Therefore, the order of the SPS HARQ-ACK bits of the SPS PDSCH resources SR12, SR22, SR32, and SR42 in the slot S2 in the codebook CB2 may be as shown in FIG. 1C. Then, after determining the SPS HARQ-ACK bit order of the SPS HARQ-ACK bits of the SPS PDSCH resources SR12, SR22, SR32, and SR42 in the slot S2 in the codebook CB2, the user equipment 1 generates an HARQ-ACK message comprising the codebook CB2 according to the SPS HARQ-ACK bit order, and transmits the HARQ-ACK message on the PUCCH resource UCR2 to the base station 2.

It shall be appreciated that, when ordering the SPS HARQ-ACK bits, the user equipment 1 starts the ordering from the SPS HARQ-ACK bit of the SPS PDSCH resource with the smallest configuration index and the earliest time-domain position on the component carrier with the smallest component carrier index in the slot or the sub-slot. In addition, since the SPS PDSCH resources are periodic, after the user equipment 1 determines the configuration index, it is necessary for the user equipment 1 to determine the SPS HARQ-ACK bit order of a plurality of SPS PDSCH resources in the SPS PDSCH resource configuration of the determined configuration index according to the time-domain position. In other words, only in the case of the SPS HARQ-ACK bit order between a same group of SPS PDSCH resources, will the time-domain location be taken into consideration.

Figure 1D:
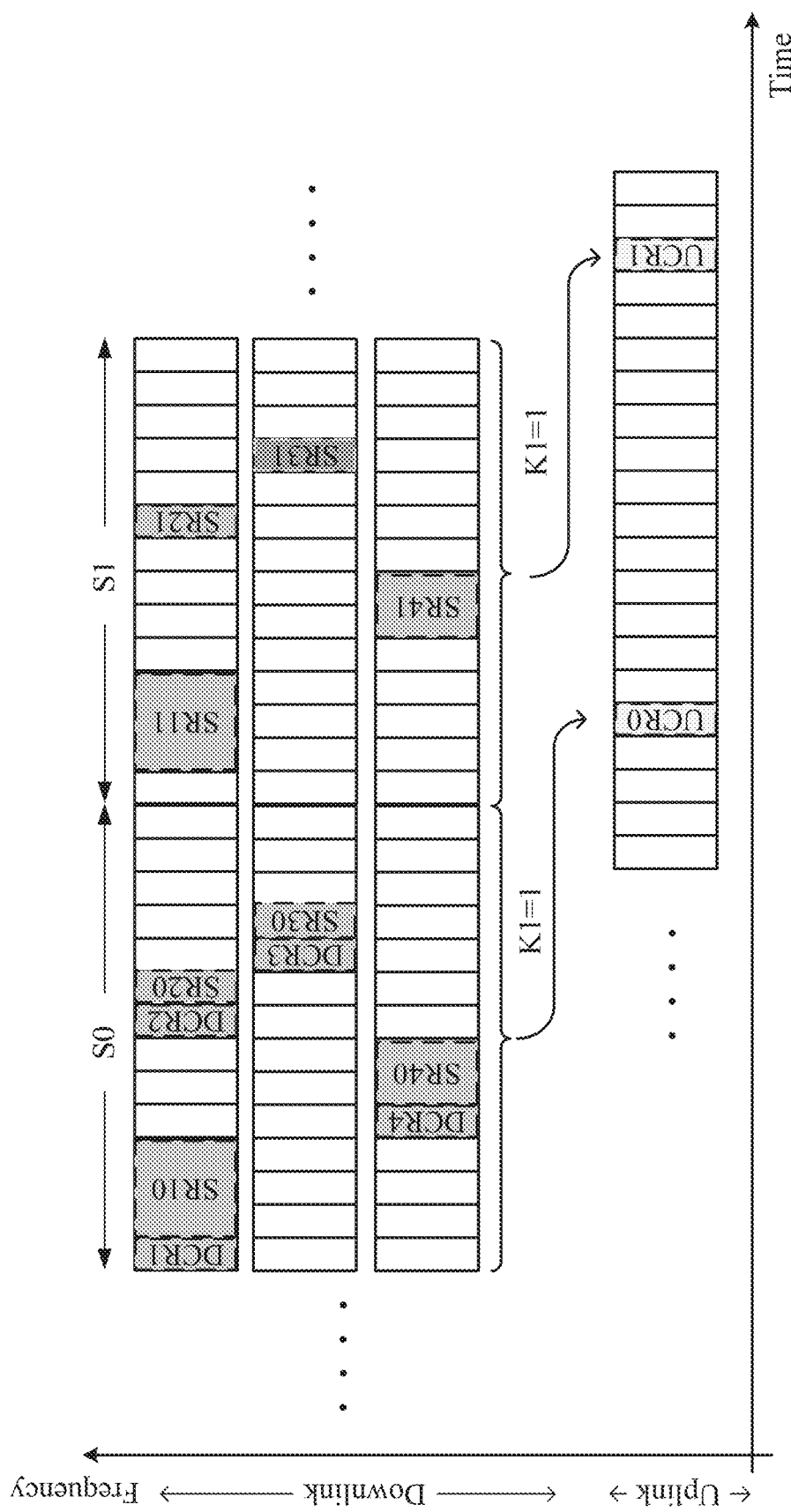
FIG. 1D depicts an implementation scenario of activated SPS PDSCH resources of the present invention.
Figure 1E:
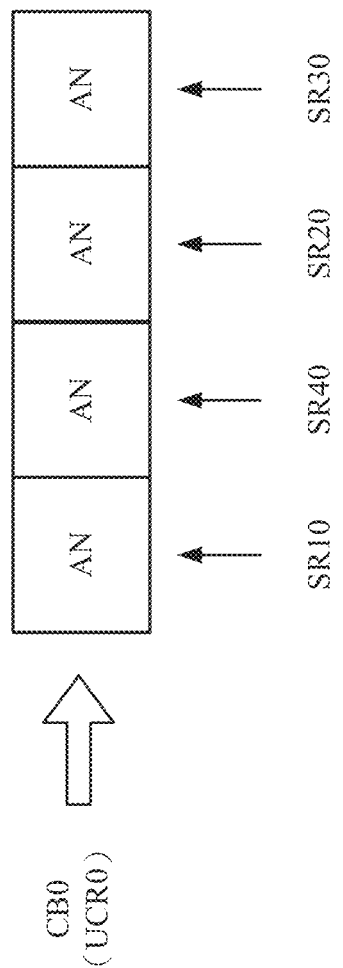
FIG. 1E depicts a codebook transmitted on a PUCCH resource UCR0 of the present invention.

A second embodiment of the present invention is as shown in FIG. 1D to FIG. 1E. The second embodiment is an extension of the first embodiment. After configuring each SPS PDSCH resource group, the base station 2 may instruct, through the DCI, the to-be-activated SPS PDSCH resource group to be activated. Specifically, the user equipment 1 further monitors a plurality of activated SPS PDSCH resources to receive downlink data signals transmitted by the base station 2. Each activated SPS PDSCH resource is indicated by the DCI, and each DCI carries an HARQ feedback timing indicator K1, and a value of each HARQ feedback timing indicator K1 maps the SPS PDSCH resource to a target slot. It is assumed here that the value of each of the HARQ feedback timing indicators K1 is 1, so the user equipment 1 provides feedback on the downlink reception correctness in units of one slot and transmits the corresponding codebook on a PUCCH resource in a next slot.

An example is given herein, and please refer to FIG. 1D. In a slot S0, the base station 2 configures multiple groups of SPS PDSCH resources, and transmits the DCI respectively on the PDCCH resources DCR1, DCR2, DCR3, and DCR4 before the first SPS PDSCH resource SR10, SR20, SR30, and SR40 in each of the SPS PDSCH resource groups to activate each of the SPS PDSCH resource groups.

In detail, the DCI transmitted by the base station 2 on the PDCCH resource DCR1 indicates that the SPS PDSCH resource group with the configuration index of 1 (i.e., including: SPS PDSCH resources SR10, SR11, and SR12) is activated, the DCI transmitted by the base station 2 on the PDCCH resource DCR2 indicates that the SPS PDSCH resource group with the configuration index of 2 (i.e., including: SPS PDSCH resources SR20, SR21, and SR22) is activated, the DCI transmitted by the base station 2 on the PDCCH resource DCR3 indicates that the SPS PDSCH resource group with the configuration index of 3 (i.e., including: SPS PDSCH resources SR30, SR31, and SR32) is activated, and the DCI transmitted by the base station 2 on the PDCCH resource DCR4 indicates that the SPS PDSCH resource group with the configuration index of 4 (i.e., including: SPS PDSCH resources SR40, SR41, and SR42) is activated.

As mentioned above, this embodiment assumes that the value of the HARQ feedback timing indicator K1 carried by each DCI transmitted on the PDCCH resources DCR1, DCR2, DCR3, and DCR4 is 1, so the target slot to which the PUCCH resources used to transmit the SPS HARQ-ACK bits of the SPS PDSCH resources SR10, SR20, SR30, and SR40 in the slot S0 are mapped is the first slot (i.e., the slot S1) after the end of the slot S0. Similarly, the target slot to which the PUCCH resources used to transmit the SPS HARQ-ACK bits of the SPS PDSCH resources SR11, SR21, SR31, and SR41 in the slot S1 are mapped is the first slot (i.e., the slot S2) after the end of the slot S1.

In addition, for the selection of the PUCCH resource, the user equipment 1 may calculate a total number of HARQ-ACK bits corresponding to the SPS PDSCH resources, and select the PUCCH resource from a plurality of candidate PUCCH resources in the target slot according to the total number of HARQ-ACK bits. Further speaking, the target slot may contain a plurality of candidate PUCCH resources therein, and the PUCCH formats of the candidate PUCCH resources may have the same or different maximum encoding rates. Therefore, the user equipment 1 may select an appropriate PUCCH resource from the candidate PUCCH resources according to the number of HARQ-ACK bits to be fed back. For example, after the user equipment 1 calculates the total number of HARQ-ACK bits corresponding to the SPS PDSCH resources SR11, SR21, SR31, and SR41 to be 4 bits, the user equipment 1 selects the suitable PUCCH resource UCR1 from the target slot.

In addition, in the present invention, for the SPS PDSCH resource with the corresponding DCI, the activated SPS HARQ-ACK bit order thereof is determined based on the time-domain position and a component carrier index. Therefore, for the SPS PDSCH resources SR10, SR20, SR30, and SR40 having the corresponding DCI in the slot S0, the user equipment 1 first takes the time-domain position of the SPS PDSCH resources into consideration when ordering the SPS HARQ-ACK bits of the SPS PDSCH resources SR10, SR20, SR30, and SR40 in the slot S0. Furthermore, when there are SPS PDSCH resources with the same time-domain position, values of the component carrier indexes thereof will be further compared. Therefore, the order of the SPS HARQ-ACK bits of the SPS PDSCH resources SR10, SR20, SR30, and SR40 in the slot S0 in the codebook CB0 sequentially corresponds to the SPS PDSCH resources SR10, SR40, SR20, and SR30, as shown in FIG. 1E. It shall be appreciated that, the sequence of the time-domain positions of the SPS PDSCH resources may be determined by comparing starting symbol positions of the SPS PDSCH resources.

Furthermore, for the feedback on the downlink reception correctness on the SPS PDSCH resources SR10, SR20, SR30, and SR40 with the corresponding DCI, the user equipment 1 may calculate a total number of HARQ-ACK bits corresponding to the SPS PDSCH resources, and select a PUCCH resource set from a plurality of candidate PUCCH resource sets in the target slot according to the total number of HARQ-ACK bits, and further select the designated PUCCH resource from the PUCCH resource set according to the PUCCH Resource Indicator (PRI) indicated by the last DCI. Further speaking, the target slot may contain a plurality of candidate PUCCH resource sets therein, and the PUCCH formats of the PUCCH resources in different candidate PUCCH resource sets may have the same or different maximum encoding rates. Therefore, according to the number of HARQ-ACK bits to be fed back, the user equipment 1 may select an appropriate PUCCH resource set from the candidate PUCCH resource sets, and further select a designated PUCCH resource from the selected PUCCH resource set according to the PRI. For example, after the user equipment 1 calculates the total number of HARQ-ACK bits corresponding to the SPS PDSCH resources SR10, SR20, SR30, and SR40 to be 4 bits, the user equipment 1 selects a suitable PUCCH resource set from the target slot and selects the PUCCH resource UCR0 according to the PRI.

Figure 1F:
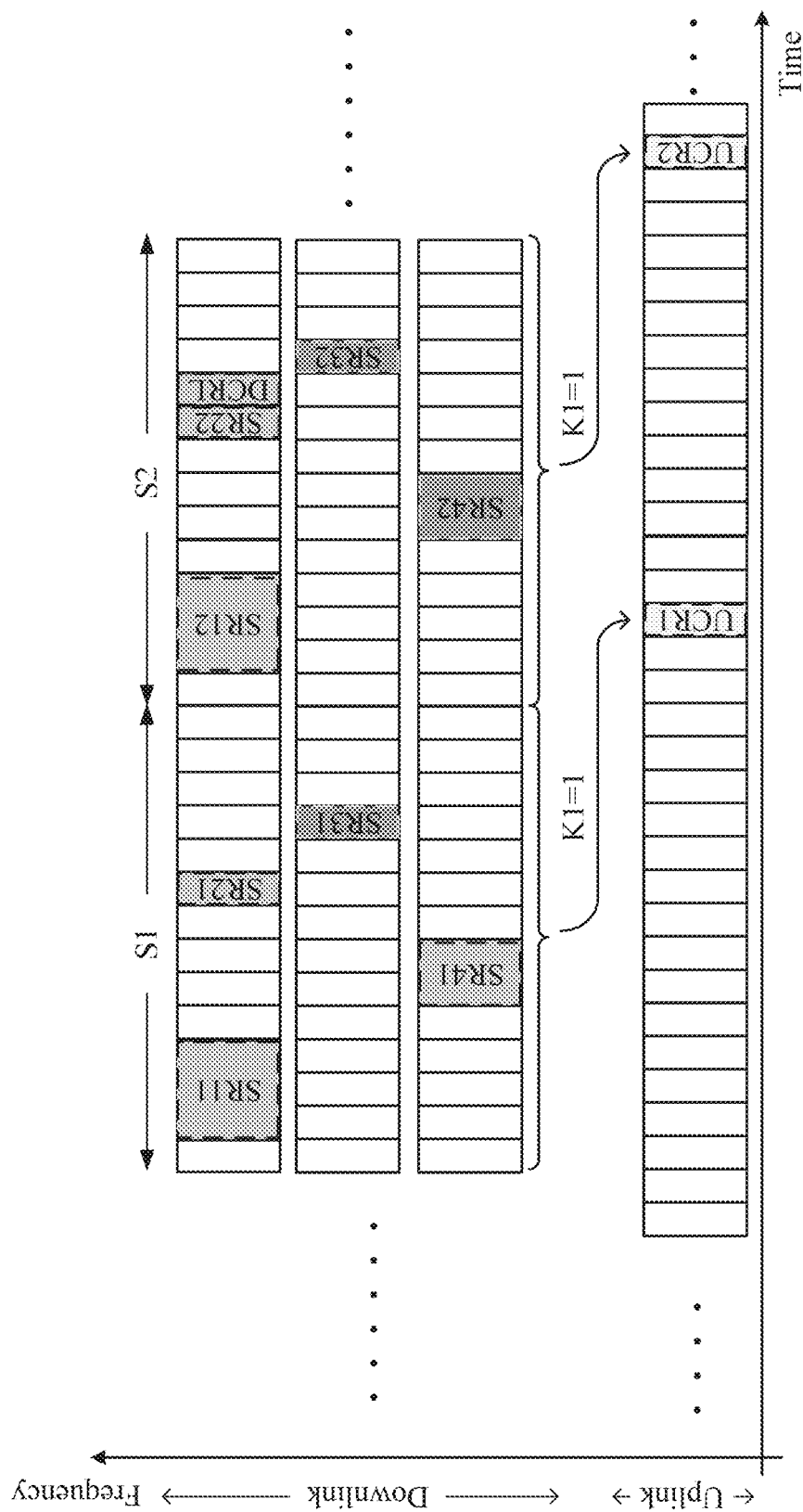
FIG. 1F depicts an implementation scenario of DCI for SPS PDSCH resource release of the present invention.
Figure 1G:
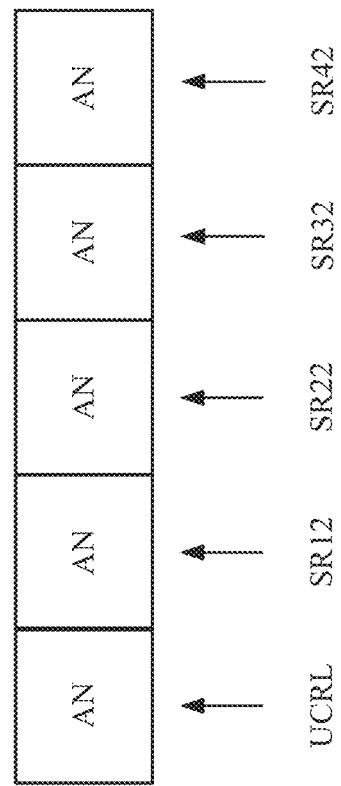
FIG. 1G depicts a codebook transmitted on the PUCCH resource UCR2 of the present invention.

A third embodiment of the present invention is as shown in FIG. 1F to FIG. 1G. The third embodiment is an extension of the first embodiment and the second embodiment. In this embodiment, the user equipment 1 further receives the DCI indicating the release of SPS PDSCH resource with a target configuration index from a Physical Downlink Control Channel (PDCCH) resource DCRL, and releases the SPS PDSCH resource corresponding to the target configuration index. The target configuration index indicated by the DCI may include one or more configuration indexes and may instruct the user equipment 1 to release the SPS PDSCH resource located on the same component carrier as the PDCCH resources DCRL. In other words, the component carrier to which the SPS PDSCH resource corresponding to the target configuration index belongs is usually the same as the component carrier to which the PDCCH resource DCRL belongs.

In order to ensure that the user equipment 1 has correctly received the DCI on the PDCCH resource DCRL and released the indicated SPS PDSCH resource, the base station 2 requires the user equipment 1 to provide feedback on whether it has correctly received the DCI. For the feedback on the downlink reception correctness of the DCI, the user equipment 1 determines the HARQ-ACK bit order of the released HARQ-ACK bit corresponding to the PDCCH resource DCRL in the codebook CB2 according to the time-domain position and the CC index of the PDCCH resource DCRL. Here, the released HARQ-ACK bit is configured to indicate the downlink reception correctness on the PDCCH resource DCRL, and the order thereof in the codebook CB2 is superior to the SPS HARQ-ACK bit. Thus, the HARQ-ACK bit order in the codebook CB2 is the released HARQ-ACK bit corresponding to the PDCCH resource DCRL followed by the SPS HARQ-ACK bits corresponding to the SPS PDSCH resources SR12, SR22, SR32, and SR42, as shown in FIG. 1G. Finally, the user equipment 1 generates an HARQ-ACK message including the codebook CB2 according to the SPS HARQ-ACK bit order (corresponding to the SPS PDSCH resources SR12, SR22, SR32, and SR42) and the HARQ-ACK bit order (corresponding to the PDCCH resource DCRL), and transmits the HARQ-ACK message including the codebook CB2 on the PUCCH resource UCR2.

Figure 2A:
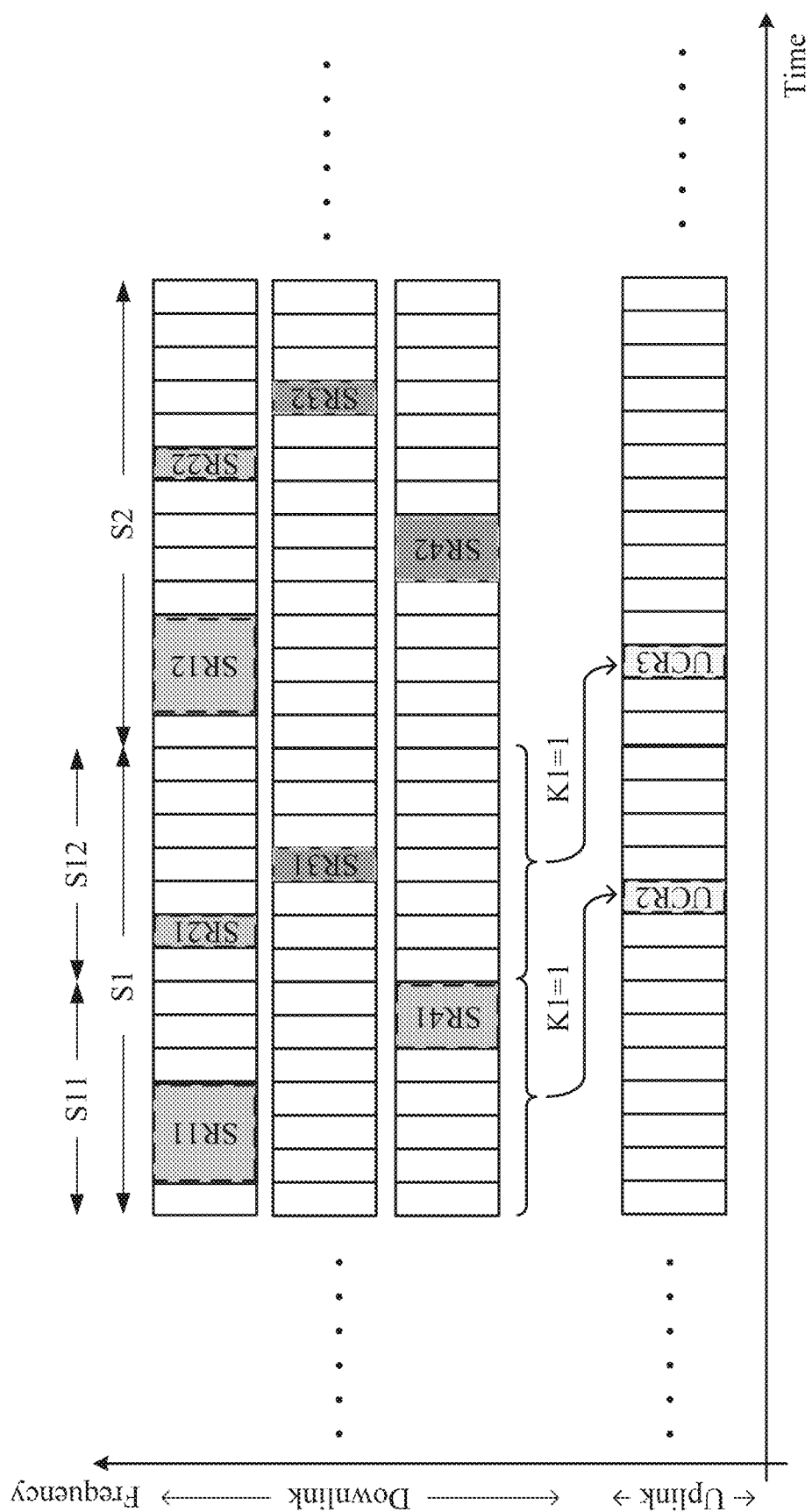
FIG. 2A depicts an implementation scenario of SPS PDSCH resource configuration in a sub-slot of the present invention.
Figure 2B:
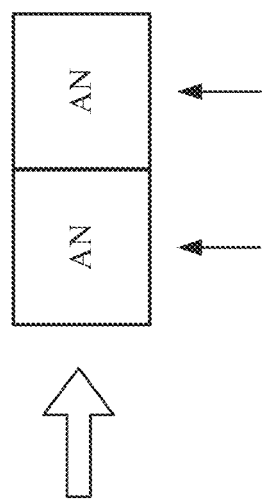
FIG. 2B depicts a codebook transmitted on the PUCCH resource UCR2 of the present invention.
Figure 2C:
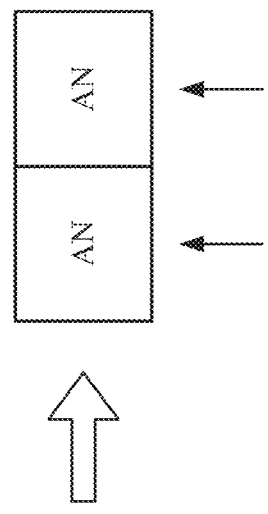
FIG. 2C depicts a codebook transmitted on a PUCCH resource UCR3 of the present invention.

A fourth embodiment of the present invention is as shown in FIG. 2A to FIG. 2C. Different from the first embodiment where the base station 2 instructs the user equipment 1 to feed back in units of one slot, the base station 2 in this embodiment instructs the user equipment 1 to feed back in units of one sub-slot. Specifically, in order to enable the downlink receiving correctness on the PDSCH resources of the URLLC service type to be fed back more instantly to meet transmission requirements of low delay and reliability, the slot may be defined as consisting of a plurality of sub-slots, e.g., one slot contains two sub-slots therein. In this embodiment, the user equipment 1 also determines the SPS HARQ-ACK bit order of the SPS HARQ-ACK bits of the SPS PDSCH resources SR11, SR12, SR21, SR22, SR31, SR32, SR41 and SR42 in the codebook by sequentially taking the component carrier index, the configuration index, and the time-domain position into consideration.

In detail, in FIG. 2A, for a sub-slot S11, the user equipment 1 first schedules the SPS HARQ-ACK bit of the SPS PDSCH resource SR11 with the configuration index of 1 on the component carrier CC1 with the smallest component carrier index into the codebook CB2, and then schedules the SPS HARQ-ACK bit of the SPS PDSCH resource SR41 with the configuration index of 4 on the component carrier CC3 into the codebook CB2, as shown in FIG. 2B. Finally, the user equipment 1 generates an HARQ-ACK message including the codebook CB2 according to the SPS HARQ-ACK bit order, and transmits the HARQ-ACK message to the base station 2 on the PUCCH resource UCR2.

For another example, referring to FIG. 2A and FIG. 2C, when the user equipment 1 intends to feed back the SPS HARQ-ACK bit order of the SPS HARQ-ACK bits of the SPS PDSCH resources SR21 and SR31 in a sub-slot S12 in a codebook CB3, the user equipment 1 also needs to sequentially take the slot, the component carrier index, the configuration index, and the time-domain position into consideration. Therefore, the order of the SPS HARQ-ACK bits of the SPS PDSCH resources in the sub-slot S12 in the codebook CB3 corresponds to the SPS PDSCH resources SR21 and SR31 in sequence, as shown in FIG. 2C. Similarly, the user equipment 1 generates an HARQ-ACK message comprising the codebook CB3 according to the SPS HARQ-ACK bit order, and transmits the HARQ-ACK message on the PUCCH resource UCR3 to the base station 2.

Figure 2D:
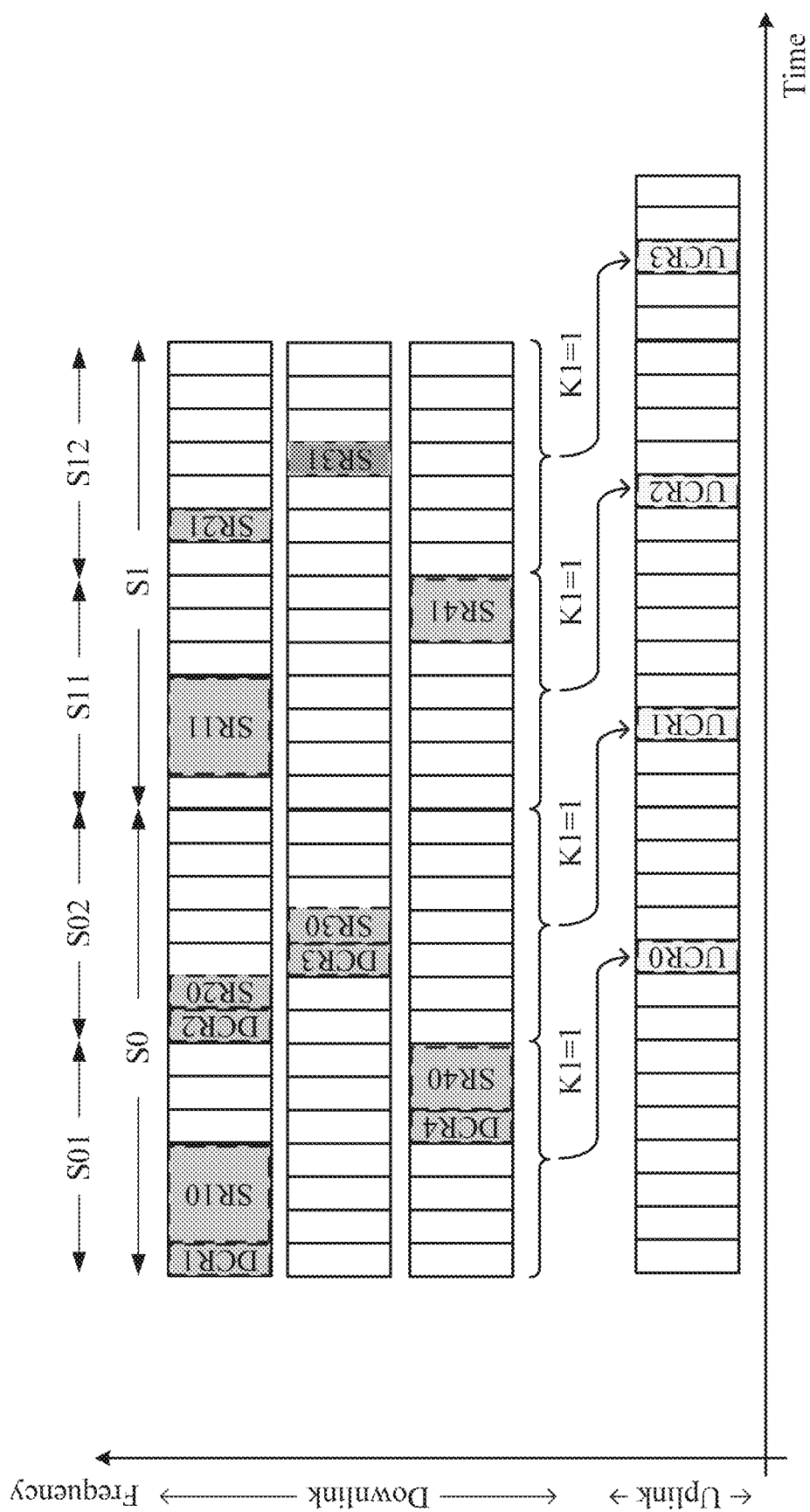
FIG. 2D depicts an implementation scenario of activated SPS PDSCH resources in a sub-slot of the present invention.

A fifth embodiment of the present invention is as shown in FIG. 2D to FIG. 2F. The fifth embodiment is an extension of the fourth embodiment. In this embodiment, the value of the HARQ feedback timing indicator carried by each DCI maps the SPS PDSCH resource to the target sub-slot.

Please refer to FIG. 2D to FIG. 2E. Similarly, in a sub-slot S01, the base station 2 may transmit the DCI on the PUCCH resource before the first SPS PDSCH resource in each SPS PDSCH resource group to activate each SPS PDSCH resource group. For example, the base station 2 transmits the DCI on the PUCCH resource DCR1 to instruct the SPS PDSCH resource group with the configuration index of 1 (i.e., including: the SPS PDSCH resources SR10, SR11, and SR12) to be activated, and transmits the DCI on the PUCCH resource DCR4 to instruct the SPS PDSCH resource group with the configuration index of 4 (i.e., including: the SPS PDSCH resources SR40, SR41, and SR42) to be activated.

It is assumed that the value of the HARQ feedback timing indicator K1 carried by each DCI transmitted on the PUCCH resources DCR1 and DCR4 is 1, so the target sub-slot to which the PUCCH resources used to transmit the SPS HARQ-ACK bits of the SPS PDSCH resources SR10 and SR40 in the sub-slot S01 are mapped is the first sub-slot (i.e., a sub-slot S02) after the end of the sub-slot S01. Similarly, the target sub-slot to which the PUCCH resources used to transmit the SPS HARQ-ACK bits of the SPS PDSCH resources SR20 and SR30 in the sub-slot S02 are mapped is the first sub-slot (i.e., the sub-slot S11) after the end of the sub-slot S02.

Similarly, for the selection of the PUCCH resource, the user equipment 1 may calculate a total number of HARQ-ACK bits corresponding to the SPS PDSCH resources, and select the PUCCH resource from a plurality of candidate PUCCH resources in the target sub-slot according to the total number of HARQ-ACK bits. Further speaking, the target sub-slot may contain a plurality of candidate PUCCH resources therein, and the PUCCH formats of the candidate PUCCH resources may have the same or different maximum encoding rates. The user equipment 1 may calculate a total number of HARQ-ACK bits corresponding to the SPS PDSCH resources, and select the PUCCH resource UCR2 from a plurality of candidate PUCCH resources in the target sub-slot according to the total number of HARQ-ACK bits. For example, after calculating the total number of HARQ-ACK bits corresponding to the SPS PDSCH resources SR11 and SR41 to be 2 bits, the user equipment 1 selects the suitable PUCCH resource UCR2 from the target sub-slot (i.e., the sub-slot S11).

In addition, as mentioned above in the present invention, for the SPS PDSCH resource with the corresponding DCI, the activated SPS HARQ-ACK bit order thereof is determined based on the time-domain position and a component carrier index. Therefore, for the SPS PDSCH resources SR10 and SR40 having the corresponding DCI in the sub-slot S01, the user equipment 1 first takes the time-domain position of the SPS PDSCH resources into consideration when ordering the SPS HARQ-ACK bits of the SPS PDSCH resources SR10 and SR40 in the sub-slot S01. Furthermore, when there are SPS PDSCH resources with the same time-domain position, values of the component carrier indexes thereof will be further compared. Therefore, the order of the SPS HARQ-ACK bits of the SPS PDSCH resources SR10 and SR40 in the sub-slot S01 in the codebook CB0 may be as shown in FIG. 2E.

For another example, referring to FIG. 2D and FIG. 2F, the order of the SPS HARQ-ACK bits of the SPS PDSCH resources SR20 and SR30 in the sub-slot S02 in the codebook CB1 may be as shown in FIG. 2F.

Furthermore, for the feedback on the downlink reception correctness on the SPS PDSCH resources SR10, SR20, SR30, and SR40 with the corresponding DCI, the user equipment 1 may calculate a total number of HARQ-ACK bits corresponding to the SPS PDSCH resources, and select a PUCCH resource set from a plurality of candidate PUCCH resource sets in the target sub-slot according to the total number of HARQ-ACK bits, and further select the designated PUCCH resource from the PUCCH resource set according to the PUCCH Resource Indicator (PRI) indicated by the last DCI. Further speaking, the target sub-slot may contain a plurality of candidate PUCCH resource sets therein, and the PUCCH formats of the PUCCH resources in different candidate PUCCH resource sets may have the same or different maximum encoding rates. Therefore, according to the number of HARQ-ACK bits to be fed back, the user equipment 1 may select an appropriate PUCCH resource set from the candidate PUCCH resource sets, and further select a designated PUCCH resource from the selected PUCCH resource set according to the PRI. For example, after the user equipment 1 calculates the total number of HARQ-ACK bits corresponding to the SPS PDSCH resources SR10 and SR40 to be 2 bits, the user equipment 1 selects a suitable PUCCH resource set from the target slot and selects the PUCCH resource UCR0 according to the PRI.

Figure 2G:
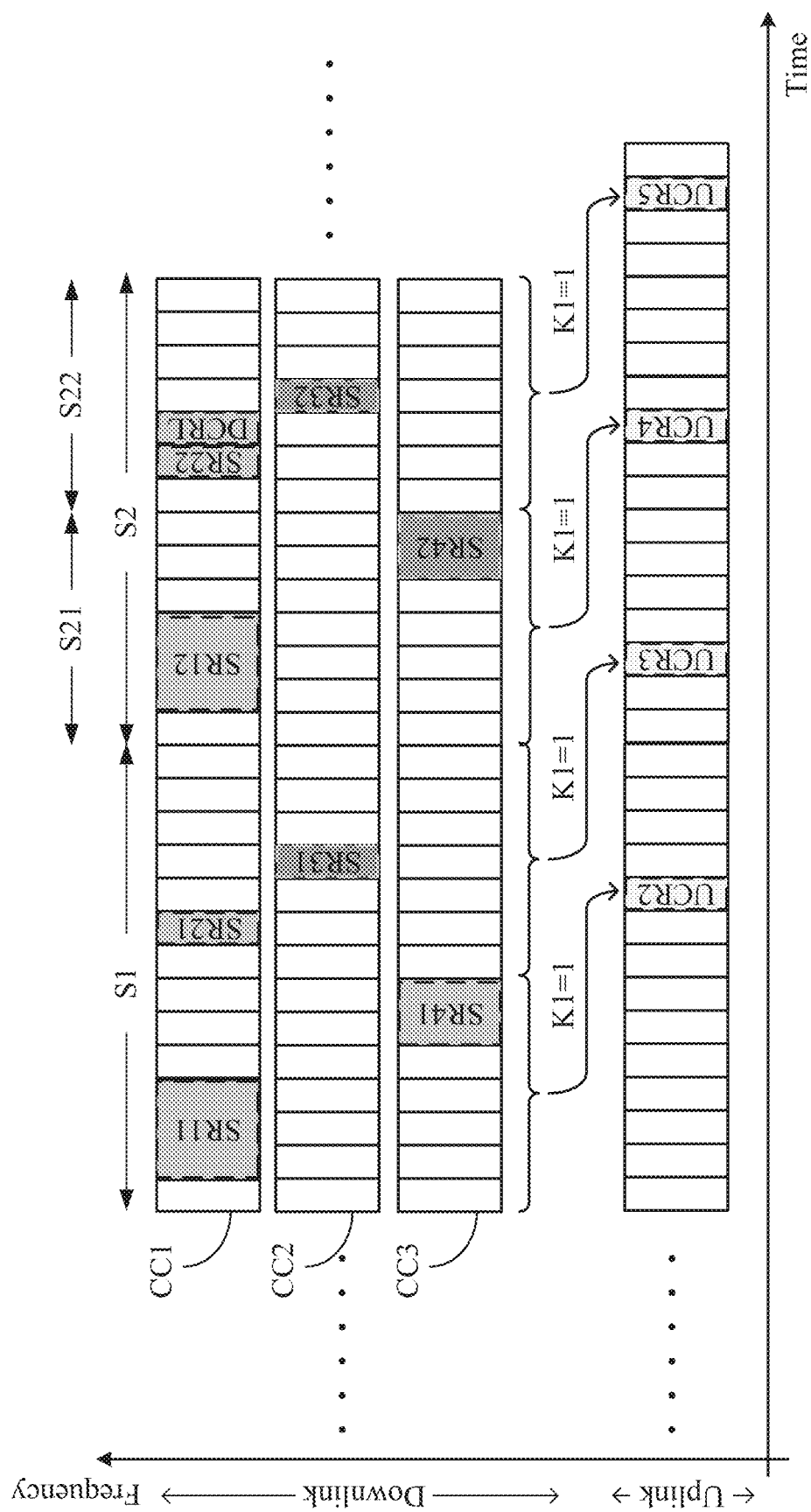
FIG. 2G depicts an implementation scenario of DCI for SPS PDSCH resource release of the present invention.
Figure 2H:
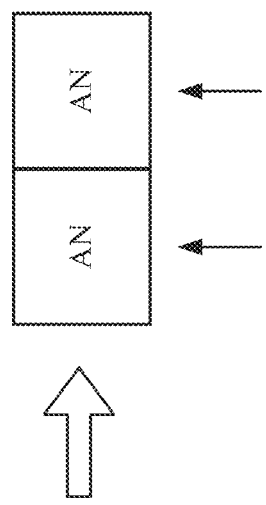
FIG. 2H depicts a codebook transmitted on a PUCCH resource UCR4 of the present invention.
Figure 2I:
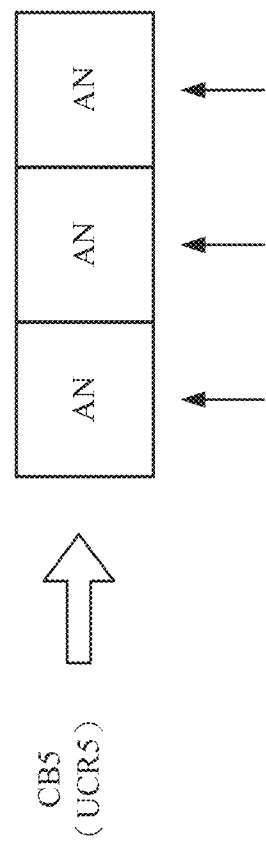
FIG. 2I depicts a codebook transmitted on a PUCCH resource UCR5 of the present invention.

A sixth embodiment of the present invention is an extension of the fourth embodiment and the fifth embodiment. In FIG. 2G, a sub-slot S21 only includes the SPS PDSCH resources SR12 and SR42 therein, and a sub-slot S22 further includes the PDCCH resource DCRL therein in addition to the SPS PDSCH resources SR22 and SR32. Therefore, the order of the SPS HARQ-ACK bits of the SPS PDSCH resources SR12 and SR42 in the sub-slot S21 in a codebook CB4 may be as shown in FIG. 2H. Furthermore, the order of the released HARQ-ACK bit of the PDCCH resource DCRL and the SPS HARQ-ACK bits of the SPS PDSCH resources SR22 and SR32 in the sub-slot S22 in a codebook CB5 may be as shown in FIG. 2I.

As mentioned above, the released HARQ-ACK bit is configured to indicate the downlink reception correctness on the PDCCH resource DCRL, and the order thereof in the codebook is superior to the SPS HARQ-ACK bit.

A seventh embodiment of the present invention is as shown in FIG. 3A to FIG. 3E. In this embodiment, the plurality of PDSCH resources monitored by the user equipment 1 further comprises a plurality of dynamically scheduled PDSCH resources (e.g., dynamically scheduled PDSCH resources DR10, DR11, DR12, DR20, DR21, DR22) in addition to the activated SPS PDSCH resources of the previous embodiments. The user equipment 1 determines the HARQ-ACK bit order of a plurality of HARQ-ACK bits corresponding to the PDSCH resources in the codebook according to the time-domain position and the CC index of each of the PDSCH resources, and generates an HARQ-ACK message including the codebook according to the SPS HARQ-ACK bit order and the HARQ-ACK bit order. Similarly, the base station 2 can use the HARQ feedback timing indicator K1 to instruct the user equipment 1 to feed back the downlink reception correctness on the PUCCH resource that slot through the downlink control information (DCI) describing each dynamically scheduled PDSCH resource. This embodiment also assumes that the value of the HARQ feedback timing indicator K1 carried in each DCI is 1. However, implementations in which the HARQ feedback timing indicator K1 has other values shall be appreciated by those of ordinary skill in the art, and thus will not be further described herein.

Figure 3A:
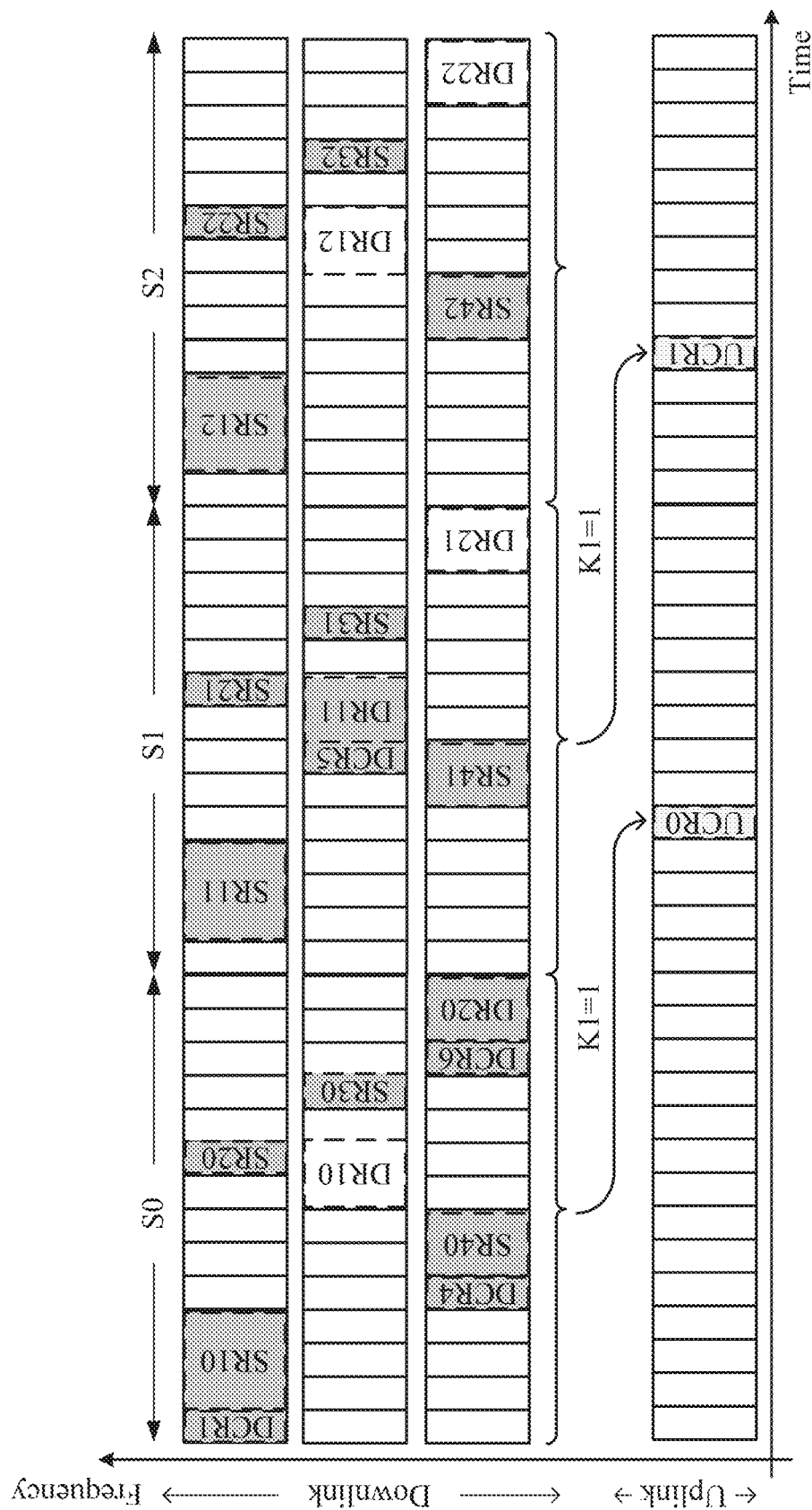
FIG. 3A depicts an implementation scenario of SPS PDSCH resource and dynamically scheduled PDSCH resource configuration in a slot of the present invention.
Figure 3B:
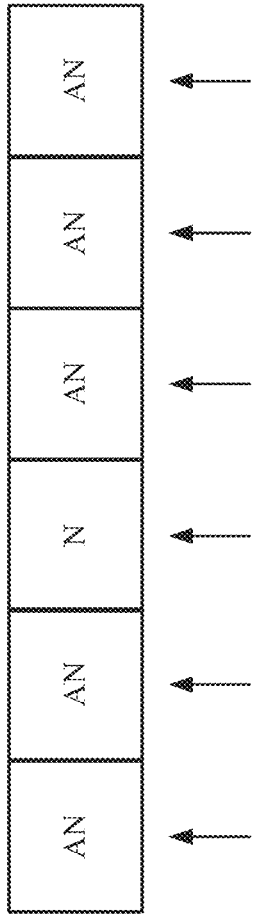
FIG. 3B depicts a codebook of a semi-static codebook type transmitted on the PUCCH resource UCR0 of the present invention.
Figure 3C:
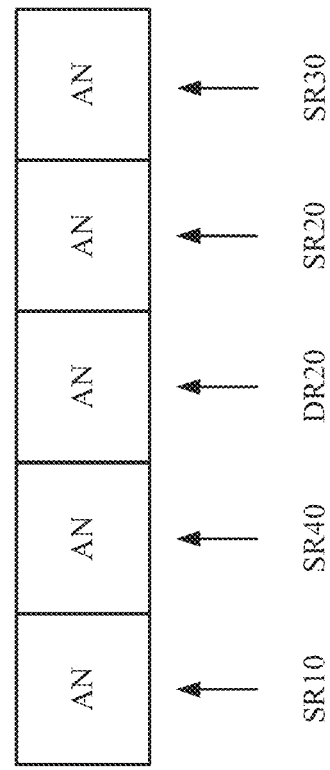
FIG. 3C depicts a codebook of a dynamic codebook type transmitted on the PUCCH resource UCR0 of the present invention.

For example, please refer to FIG. 3B to FIG. 3C. For the slot S0, the PDSCH resources configured by the base station 2 include the SPS PDSCH resources SR10, SR20, SR30, SR40 and the dynamically scheduled PDSCH resources DR10, DR20. The base station 2 transmits the DCI on the PDCCH resources DCR1 and DCR4 to activate the SPS PDSCH resources with configuration indexes of 1 and 4, and transmits the DCI on the PDCCH resource DCR6 to instruct the user equipment 1 to receive a downlink data signal on the dynamically scheduled PDSCH resource DR20.

As in the previous embodiments, the user equipment 1 needs to first order the HARQ-ACK bits of the SPS PDSCH resources SR10, SR40 and the dynamically scheduled PDSCH resources DR10, DR20 indicated by the DCI, and then order the SPS HARQ-ACK bits of the SPS PDSCH resources SR20, SR30 not indicated by the DCI based on the time-domain position and the CC index.

If the base station 2 instructs, in advance by the RRC message, the user equipment 1 to feed back the HARQ-ACK bits with the codebook of the semi-static codebook type, then the codebook needs to include the HARQ-ACK bits of all PDSCH resources regardless of whether the user equipment 1 has received the downlink data signal or not on each PDSCH resource. Therefore, the order of the HARQ-ACK bits of the dynamically scheduled PDSCH resources DR10, DR20 and the HARQ-ACK bits of the SPS PDSCH resources SR10, SR20, SR30, and SR40 in the slot S0 in the codebook CB0 may be as shown in FIG. 3B.

If the base station 2 instructs, in advance by the RRC message, the user equipment 1 to feed back the HARQ-ACK bits with the dynamic codebook type, then the user equipment 1 only needs to feed back the HARQ-ACK bits of the dynamically scheduled PDSCH resource on which the downlink data signal has been received, and does not need to feed back the HARQ-ACK bits of the dynamically scheduled PDSCH resource on which the downlink data signal has not been received. Therefore, the order of the HARQ-ACK bits of the dynamically scheduled PDSCH resource DR20 and the HARQ-ACK bits of the SPS PDSCH resources SR10, SR20, SR30, SR40 in the slot S0 in the codebook CB0 may be as shown in FIG. 3C.

Figure 3D:
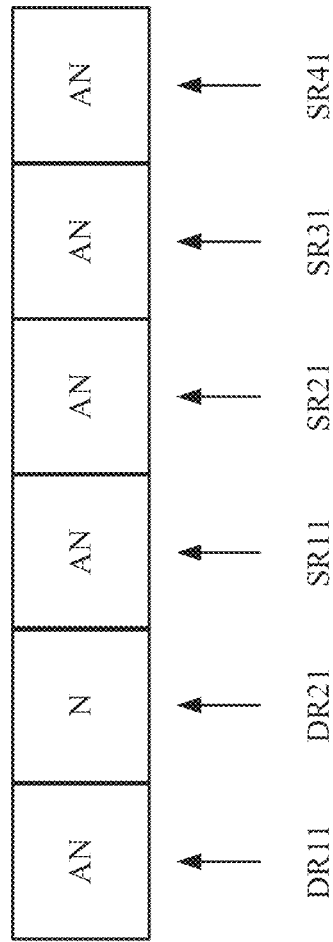
FIG. 3D depicts a codebook of a semi-static codebook type transmitted on the PUCCH resource UCR1 of the present invention.
Figure 3E:
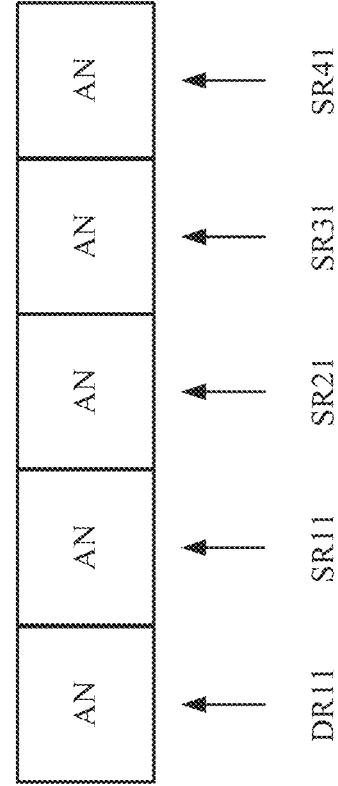
FIG. 3E depicts a codebook of a dynamic codebook type transmitted on the PUCCH resource UCR1 of the present invention.

For another example, referring to FIG. 3D to FIG. 3E, in the slot S1, the PDSCH resources configured by the base station 2 include the SPS PDSCH resources SR11, SR21, SR31, SR41 and the dynamically scheduled PDSCH resources DR11, DR21, and the base station 2 transmits the DCI on a PDCCH resource DCR5 to instruct the user equipment 1 to receive downlink data signals on the dynamically scheduled PDSCH resource DR11. If the user equipment 1 feeds back the HARQ-ACK bits with the semi-static codebook type, then the order of the HARQ-ACK bits of the dynamically scheduled PDSCH resources DR11, DR21 and the SPS HARQ-ACK bits of the SPS PDSCH resources SR11, SR21, SR31, and SR41 in the slot S1 in the codebook CB1 may be as shown in FIG. 3D. If the user equipment 1 feeds back the HARQ-ACK bits with the dynamic codebook type, then the order of the HARQ-ACK bit of the dynamically scheduled PDSCH resource DR11 and the SPS HARQ-ACK bits of the SPS PDSCH resources SR11, SR21, SR31, and SR41 in the slot S1 in the codebook CB1 may be as shown in FIG. 3E.

Similarly, in this embodiment, the user equipment 1 may calculate a total number of HARQ-ACK bits corresponding to the dynamically scheduled PDSCH resources and the SPS PDSCH resources, and select a PUCCH resource set from a plurality of candidate PUCCH resource sets in the target slot according to the total number of HARQ-ACK bits, and further select the designated PUCCH resource from the PUCCH resource set according to the PUCCH Resource Indicator (PRI) indicated by the last DCI. Further speaking, the target slot may contain a plurality of candidate PUCCH resource sets therein, and the PUCCH formats of the PUCCH resources in different candidate PUCCH resource sets may have the same or different maximum encoding rates. Therefore, according to the number of HARQ-ACK bits to be fed back, the user equipment 1 may select an appropriate PUCCH resource set from the candidate PUCCH resource sets, and further select a designated PUCCH resource from the selected PUCCH resource set according to the PRI.

Figure 4A:
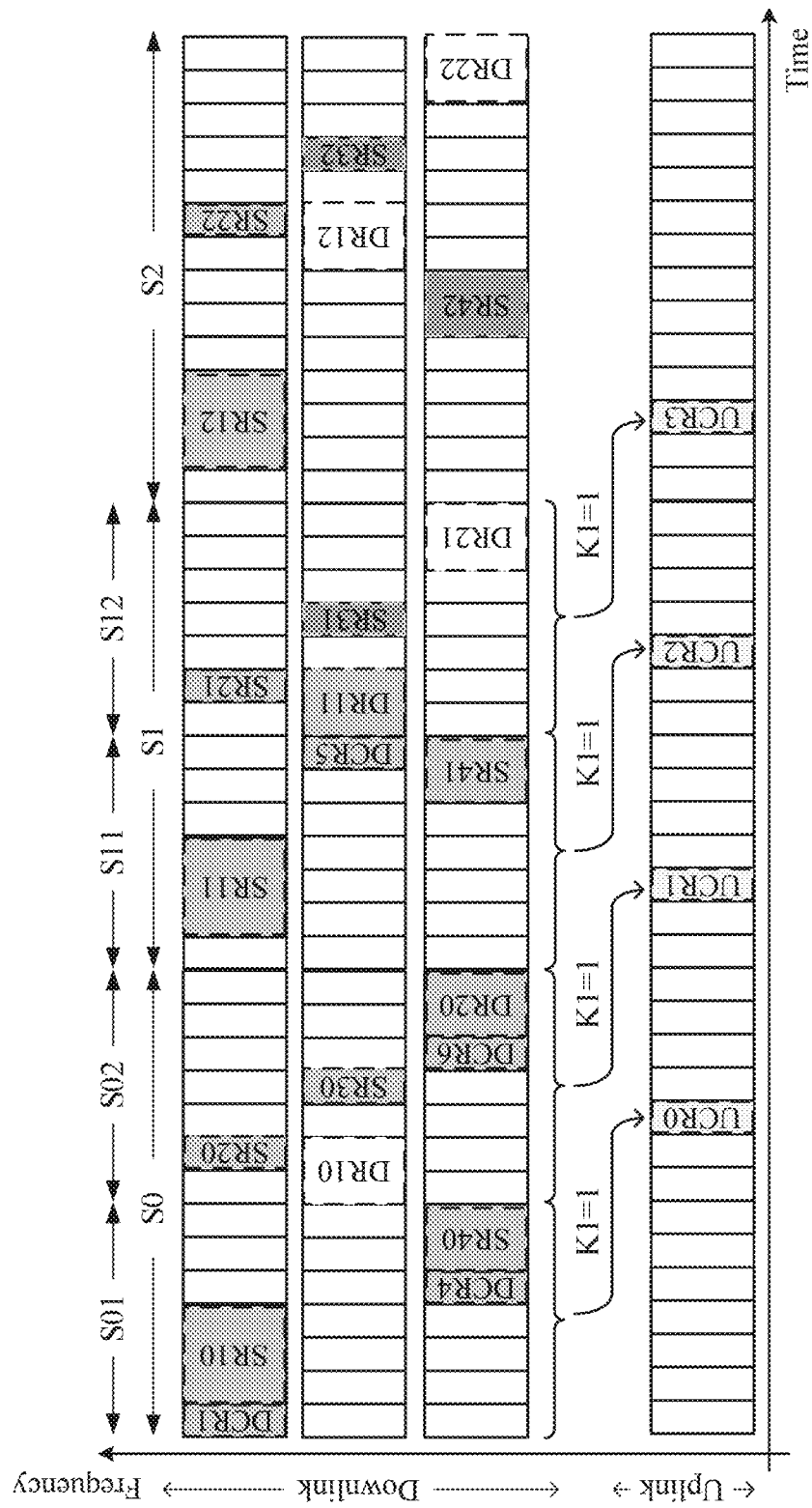
FIG. 4A depicts an implementation scenario of SPS PDSCH resource and dynamically scheduled PDSCH resource configuration in a slot of the present invention.

An eighth embodiment of the present invention is as shown in FIG. 4A to FIG. 4G. Different from the seventh embodiment, the user equipment 1 in this embodiment provides feedback in units of one sub-slot. In FIG. 4A, the base station 2 transmits the DCI on the PDCCH resources DCR1 and DCR4 in the sub-slot S01 to activate the SPS PDSCH resources with configuration indexes of 1 and 4 and configure the SPS PDSCH resources SR10 and SR40. Therefore, the order of the SPS HARQ-ACK bits of the SPS PDSCH resources SR10, SR40 in codebook CB0 may be as shown in FIG. 4B.

Figure 4C:
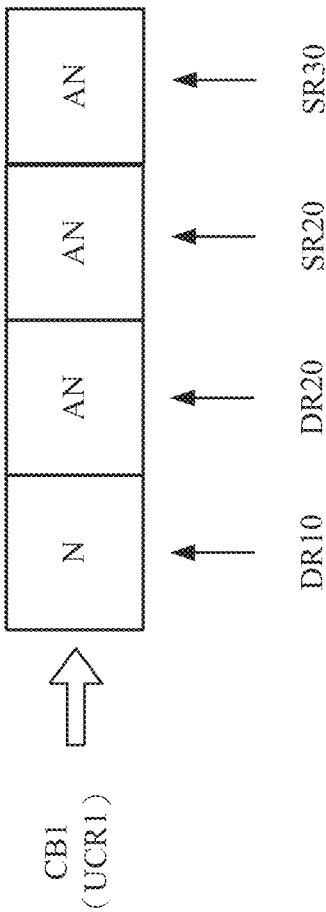
FIG. 4C depicts a codebook of a semi-static codebook type transmitted on the PUCCH resource UCR1 of the present invention.
Figure 4D:
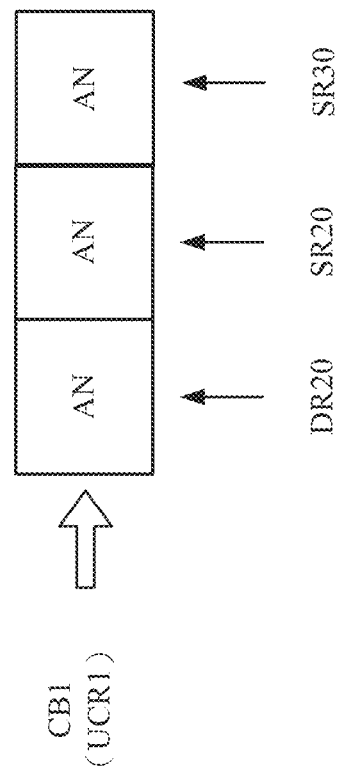
FIG. 4D depicts a codebook of a dynamic codebook type transmitted on the PUCCH resource UCR1 of the present invention.

Please refer to FIG. 4A and FIG. 4C to FIG. 4D. In the sub-slot S02, the PDSCH resources configured by the base station 2 include the SPS PDSCH resources SR20, SR30 and the dynamically scheduled PDSCH resources DR10, DR20, and the base station 2 transmits the DCI on a PDCCH resource DCR6 to instruct the user equipment 1 to receive downlink data signals on the dynamically scheduled PDSCH resource DR20. If the base station 2 instructs the user equipment 1 to feed back the HARQ-ACK bits with the semi-static codebook type, then the order of the SPS HARQ-ACK bits of the SPS PDSCH resources SR20, SR30 and the HARQ-ACK bits of the dynamically scheduled PDSCH resources DR10, DR20 in the sub-slot S02 in the codebook CB1 may be as shown in FIG. 4C. If the base station 2 instructs the user equipment 1 to feed back the HARQ-ACK bits with the dynamic codebook type, then the order of the HARQ-ACK bits of the SPS PDSCH resources SR20, SR30 and the HARQ-ACK bits of the dynamically scheduled PDSCH resource DR20 in the sub-slot S02 in the codebook CB1 may be as shown in FIG. 4D.

Figure 4E:
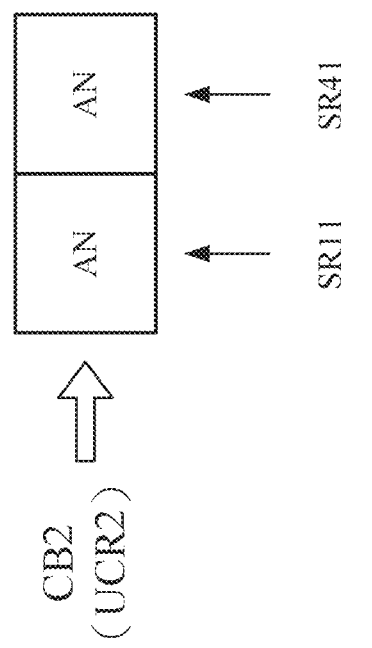
FIG. 4E depicts a codebook transmitted on the PUCCH resource UCR2 of the present invention.

Please refer to FIG. 4A and FIG. 4E. Similarly, the order of the HARQ-ACK bits of the SPS PDSCH resources SR11, SR41 in the sub-slot S11 in the codebook CB2 may be as shown in FIG. 4E. Furthermore, please refer to FIG. 4A and FIG. 4F to FIG. 4G. In the sub-slot S12, the PDSCH resources configured by the base station 2 include the SPS PDSCH resources SR21, SR31 and the dynamically scheduled PDSCH resources DR11, DR21, and the base station 2 transmits the DCI on the PDCCH resource DCR5 to instruct the user equipment 1 to receive a downlink data signal on the dynamically scheduled PDSCH resources DR21. If the base station 2 instructs the user equipment 1 to feed back the HARQ-ACK bits with the semi-static codebook type, then the order of the SPS HARQ-ACK bits of the SPS PDSCH resources SR21, SR31 and the HARQ-ACK bits of the dynamically scheduled PDSCH resources DR11, DR21 in the sub-slot S12 in the codebook CB3 may be as shown in FIG. 4F. If the base station 2 instructs the user equipment 1 to feed back the HARQ-ACK bits with the dynamic codebook type, then the order of the SPS HARQ-ACK bits of the SPS PDSCH resources SR21, SR31 and the HARQ-ACK bits of the dynamically scheduled PDSCH resource DR11 in the sub-slot S12 in the codebook CB3 may be as shown in FIG. 4G.

Figure 5A:
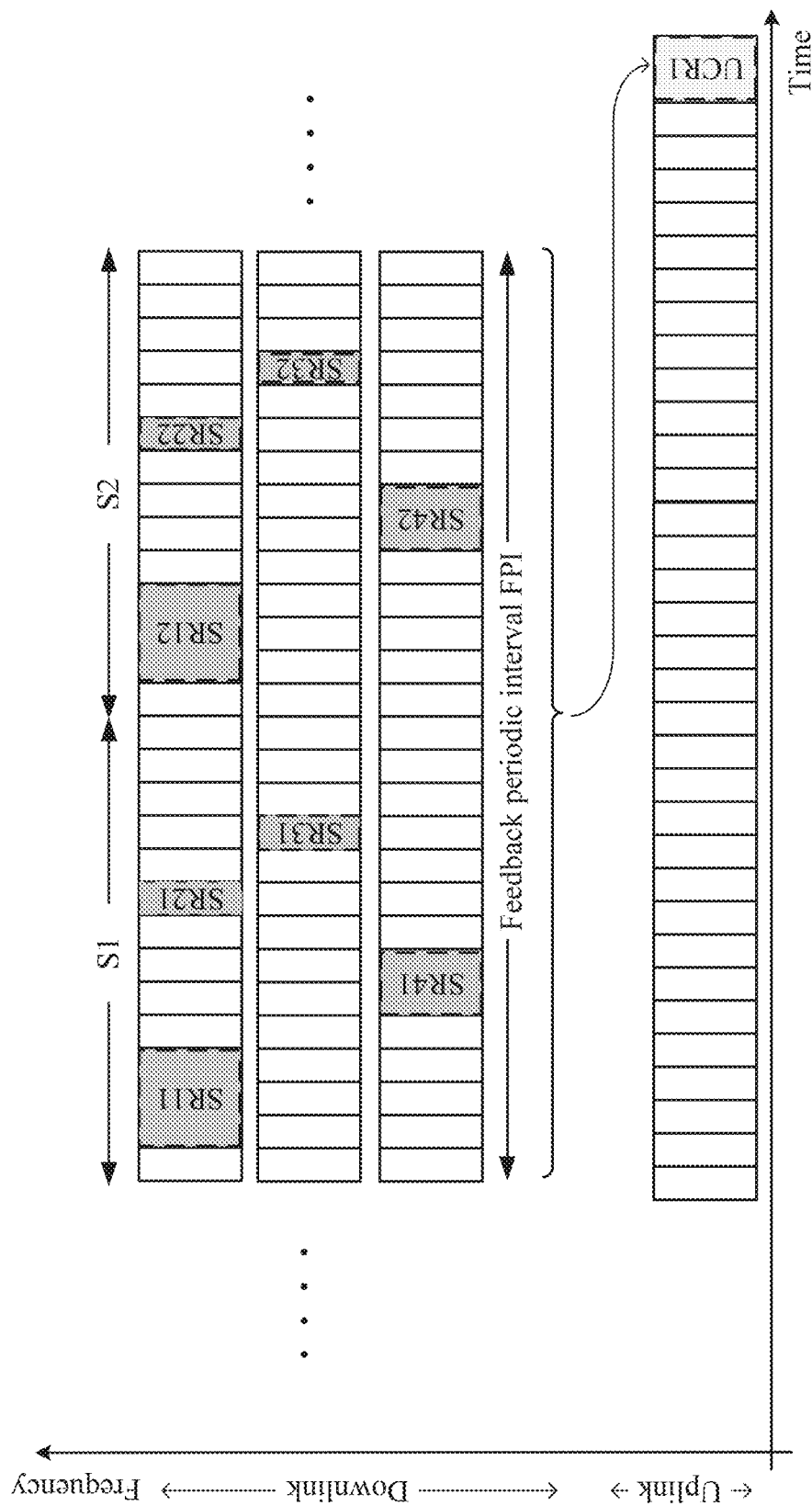
FIG. 5A depicts an implementation scenario of SPS PDSCH resource configuration in a feedback periodic interval FPI of the present invention.
Figure 5B:
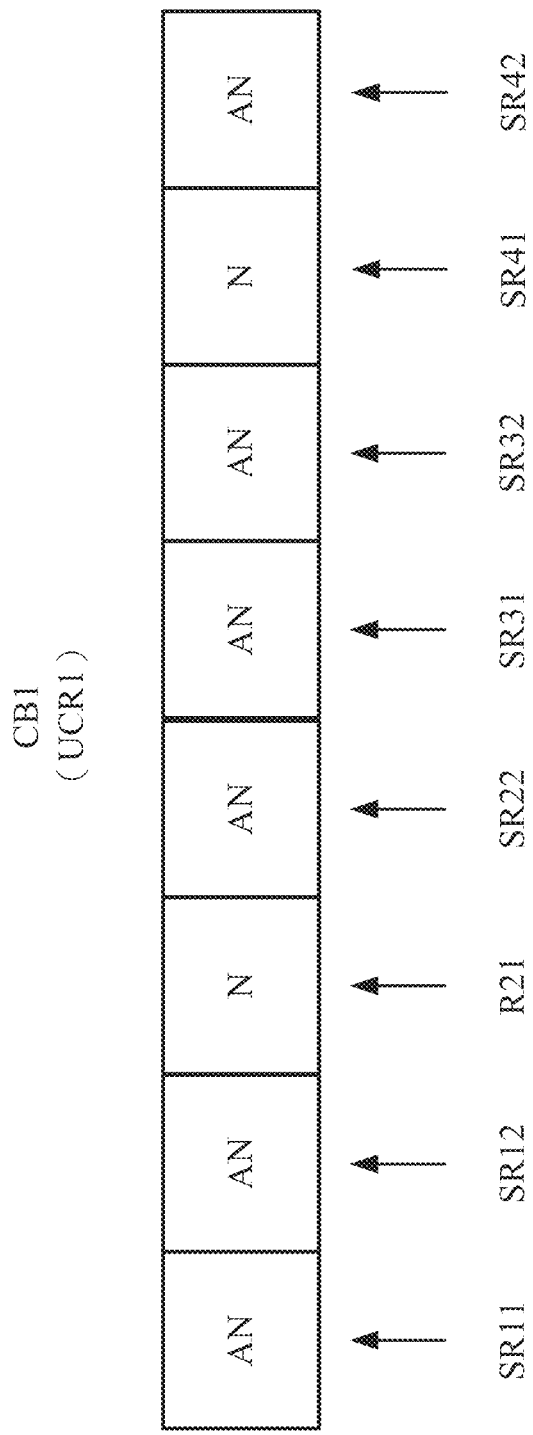
FIG. 5B depicts a codebook transmitted on the PUCCH resource UCR1 of the present invention.

A ninth embodiment of the present invention is as shown in FIG. 5A to FIG. 5B. The SPS PDSCH resources corresponding to the codebook are in a feedback periodic interval FPI in the time domain. In short, in this embodiment, the feedback on the downlink reception correctness is based on the feedback periodic interval.

Specifically, the base station 2 configures a plurality of groups of SPS PDSCH resource configuration, the SPS PDSCH resources are periodic resources and will repeatedly appear in each slot until the SPS PDSCH resource configuration is released. The base station 2 specifies that the SPS HARQ-ACK bits of the SPS PDSCH resources in the feedback periodic interval FPI need to be fed back together.

For example, the length of the feedback periodic interval FPI is two slots (e.g., including the slots S1 and S2). The slots S1 and S2 include the SPS PDSCH resources SR11, SR21, SR31, SR41, SR12, SR22, SR32, and SR42. When providing the feedback, the user equipment 1 also selects the PUCCH resource UCR1 according to the total number of HARQ-ACK bits of the SPS PDSCH resource. The order of the SPS PDSCH resources SR11, SR21, SR31, SR41, SR12, SR22, SR32, SR42 in the slots S1, S2 in the codebook CB1 may be as shown in FIG. 5B.

Please noted that, in this embodiment, the length of the feedback periodic interval FPI is illustrated by a number of slots. However, in other embodiments, the length of the feedback periodic interval FPI may also be a number of sub-slots. Implementations in which the length of the feedback periodic interval FPI is a number of sub-slots shall be appreciated by those of ordinary skill in the art, and thus will not be further described herein.

Figure 6A:
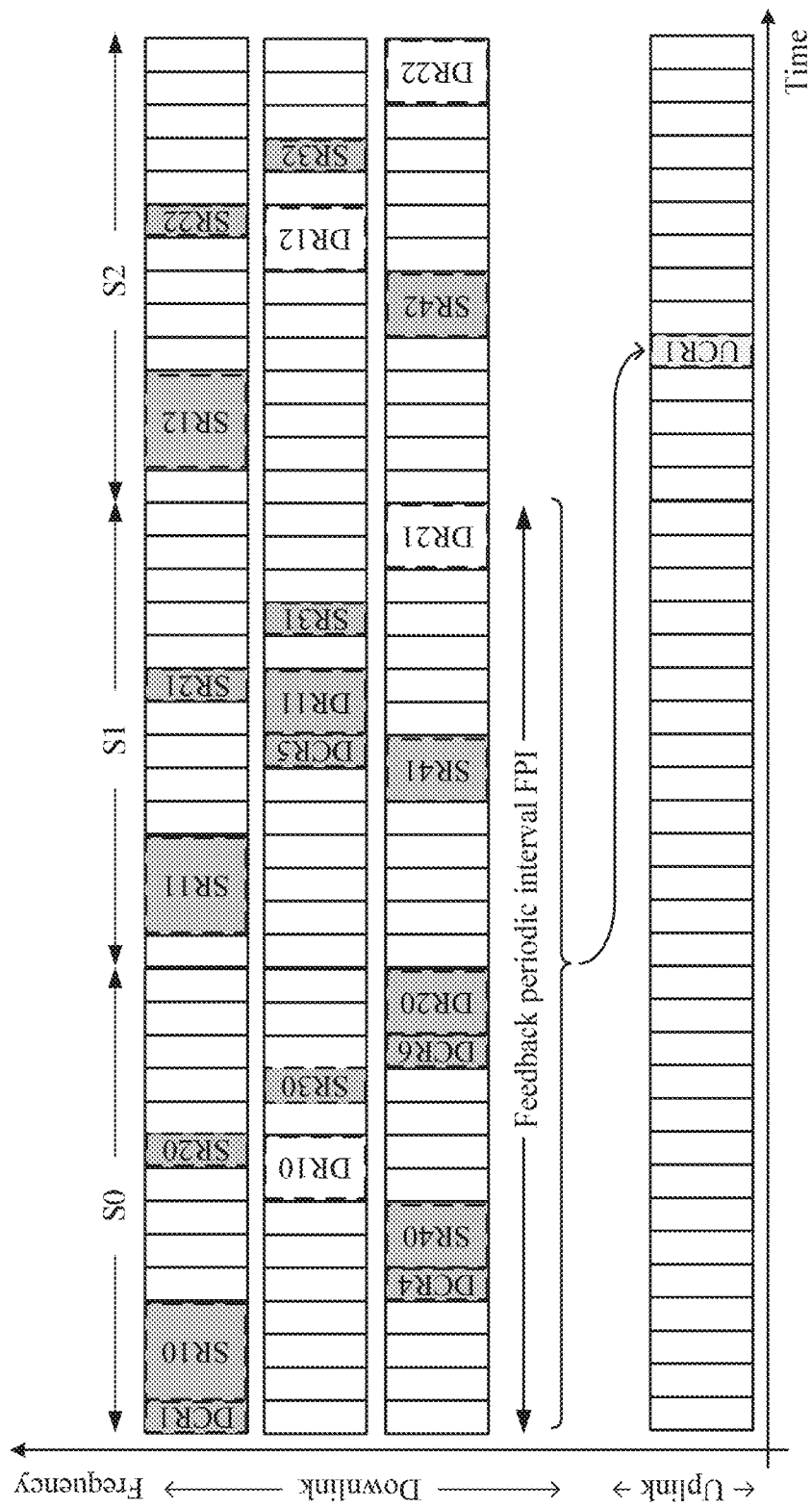
FIG. 6A depicts an implementation scenario of SPS PDSCH resource and dynamically scheduled PDSCH resource configuration in the feedback periodic interval FPI of the present invention.
Figure 6B:
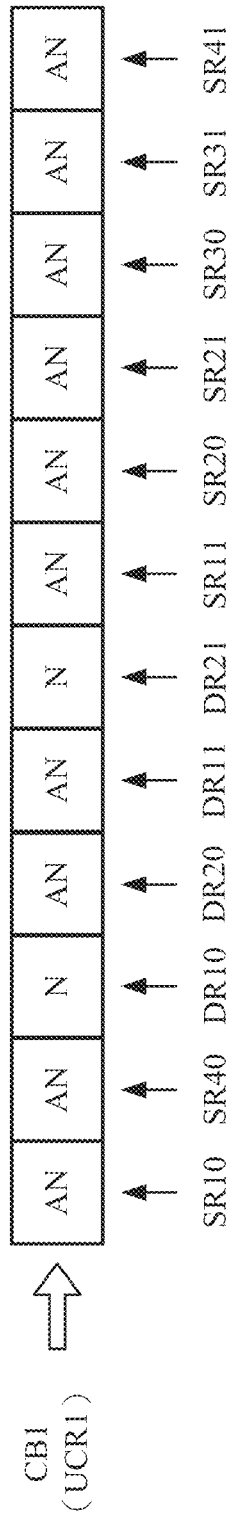
FIG. 6B depicts a codebook of a semi-static codebook type transmitted on the PUCCH resource UCR1 of the present invention.
Figure 6C:
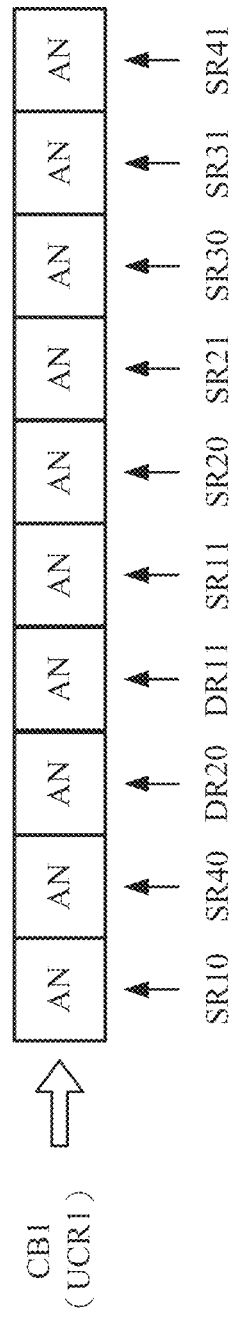
FIG. 6C depicts a codebook of a dynamic codebook type transmitted on the PUCCH resource UCR1 of the present invention.

A tenth embodiment of the present invention is as shown in FIG. 6A to FIG. 6C. The tenth embodiment is an extension of the ninth embodiment. Different from the ninth embodiment, the feedback periodic interval FPI in this embodiment further includes the DCI of the dynamically scheduled PDSCH resources and the activated SPS PDSCH resources in addition to the SPS PDSCH resources. As mentioned above, the base station 2 may instruct the user equipment 1 to use the semi-static codebook type or the dynamic codebook type.

If the base station 2 instructs the user equipment 1 to use the semi-static codebook type, then the order of the HARQ-ACK bits of the PDSCH resources SR10, SR40, DR10, DR20, DR11, DR21, SR11, SR20, SR21, SR30, SR31, SR41 of the slots S0 and S1 in the codebook CB1 may be as shown in FIG. 6B. In addition, if the base station 2 instructs the user equipment 1 to use the dynamic codebook type, then the order of the HARQ-ACK bits of the PDSCH resources SR10, SR40, DR20, DR11, SR11, SR20, SR21, SR30, SR31, SR41 of the slots S0 and S1 in the codebook CB1 may be as shown in FIG. 6C.

An eleventh embodiment of the present invention is as shown in FIG. 7A to FIG. 7D. Different from the previous embodiments that the SPS HARQ-ACK bits of the SPS PDSCH resources and the HARQ-ACK bits of the dynamically scheduled PDSCH resources in one slot or one sub-slot are fed back together in a same codebook, the base station 2 in this embodiment instructs, in advance through an RRC message (without being limited thereto), the user equipment 1 to feed back the SPS HARQ-ACK bits of the SPS PDSCH resources in one codebook, and feedback the HARQ-ACK bits of the dynamically scheduled PDSCH resources in another codebook. In short, the user equipment 1 separately feeds the SPS HARQ-ACK bits of the SPS PDSCH resources and the HARQ-ACK bits of the dynamically scheduled PDSCH resources in the same slot back to the base station 2.

Figure 7A:
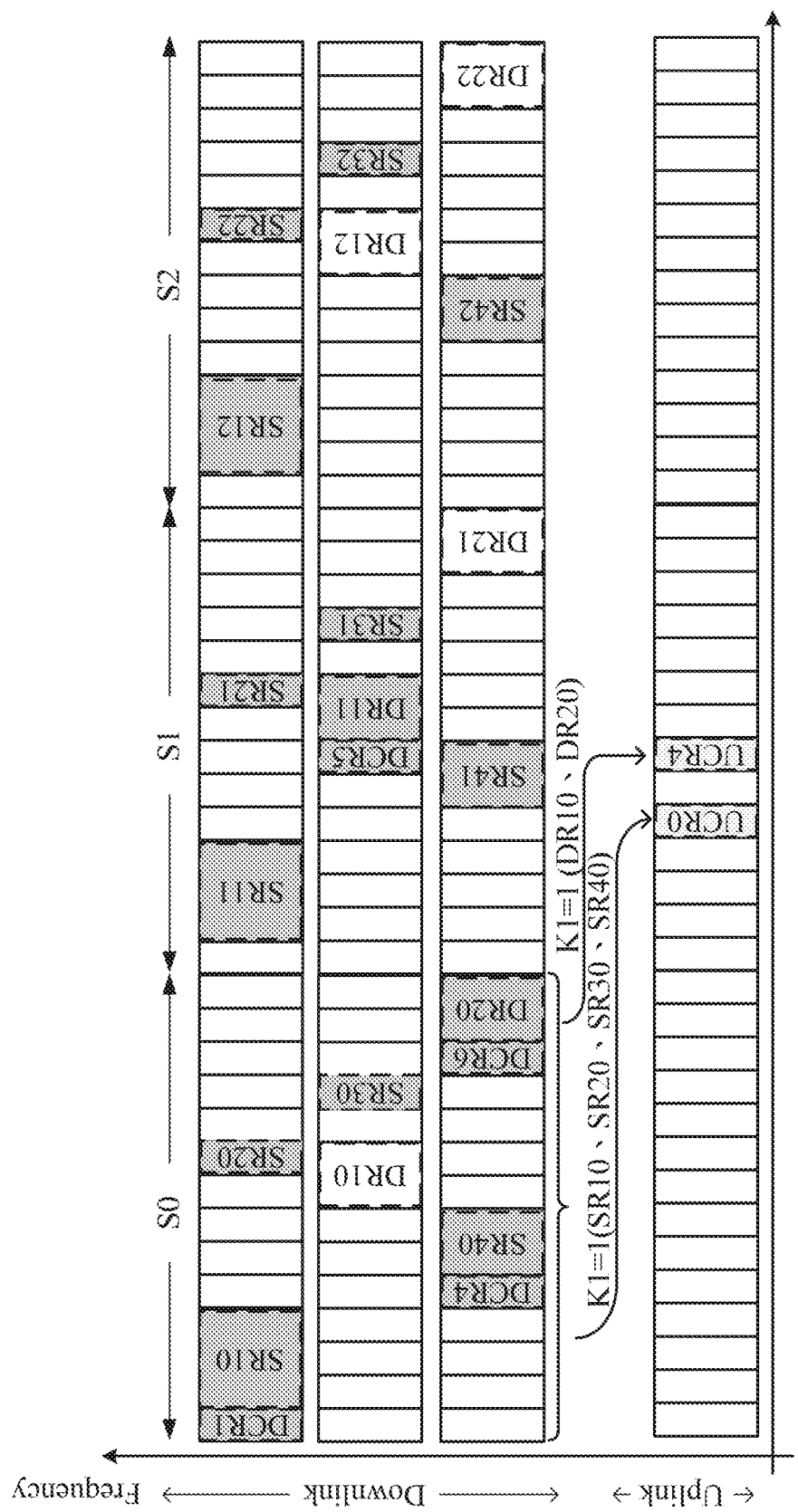
FIG. 7A depicts an implementation scenario of SPS PDSCH resource and dynamically scheduled PDSCH resource configuration in a sub-slot of the present invention.

Please refer to FIG. 7A. In the slot S0, the SPS PDSCH resources configured by the base station 2 include the SPS PDSCH resources SR10, SR20, SR30, SR40 and the dynamically scheduled PDSCH resources DR10, DR20. The base station 2 instructs through the DCI to activate the SPS PDSCH resources SR10, SR20, and SR40, so when feeding back the activated SPS HARQ-ACK bits and the SPS HARQ-ACK bits, the user equipment 1 first orders the activated SPS HARQ-ACK bits corresponding to the SPS PDSCH resources SR10, SR20, and SR40 and then orders the SPS HARQ-ACK bits corresponding to the SPS PDSCH resource SR30 according to the time-domain position and the carrier index.

Figure 7B:
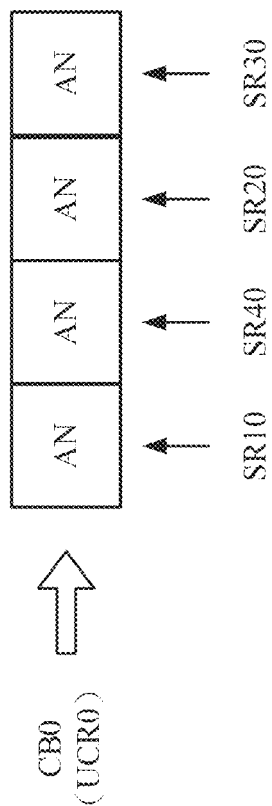
FIG. 7B depicts a codebook transmitted on the PUCCH resource UCR0 of the present invention.

In this case, the order of the activated SPS HARQ-ACK bits of the activated SPS PDSCH resources SR10, SR20, and SR40 and the SPS HARQ-ACK bit of the SPS PDSCH resource SR30 of the slot S0 in the codebook CB0 may be as shown in FIG. 7B. Finally, the user equipment 1 generates an HARQ-ACK message including the codebook CB0 according to the activated SPS HARQ-ACK bit order and the SPS HARQ-ACK bit order, and transmits the HARQ-ACK message to the base station 2 on the PUCCH resource UCR0.

Figure 7C:
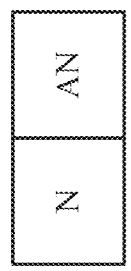
FIG. 7C depicts a codebook of a semi-static codebook type transmitted on the PUCCH resource UCR4 of the present invention.
Figure 7D:
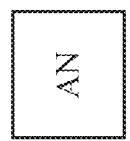
FIG. 7D depicts a codebook of a dynamic codebook type transmitted on the PUCCH resource UCR4 of the present invention.

For the slot S0, when feeding back the HARQ-ACK bits of the dynamically scheduled PDSCH resources DR10, DR20, the user equipment 1 only determines the order of the HARQ-ACK bits in the codebook CB1 according to the time-domain position and the carrier index of each dynamically scheduled PDSCH resource. If the base station 2 instructs the user equipment 1 to use the semi-static codebook type, then the order of the HARQ-ACK bits of the dynamically scheduled PDSCH resources DR10, DR20 of the slot S0 in the codebook CB4 may be as shown in FIG. 7C. If the base station 2 instructs the user equipment 1 to use the dynamic codebook type, then the order of the dynamically scheduled PDSCH resource DR20 of the slot S0 in the codebook CB4 may be as shown in FIG. 7D. As mentioned above, when using the dynamic codebook type, for the downlink reception correctness on the dynamically scheduled PDSCH resource, the user equipment 1 only feeds back the downlink reception correctness on the dynamically scheduled PDSCH resource carrying the downlink data signal, and finally, the user equipment 1 generates another HARQ-ACK message including the codebook CB4 according to the HARQ-ACK bit order, and transmits the another HARQ-ACK message to the base station 2 on the PUCCH resource UCR4. Please noted that, the another HARQ-ACK message including the codebook CB4 and the HARQ-ACK message including the codebook CB0 may be encoded at the same or different encoding rates, i.e., the PUCCH formats of the PUCCH resources used by the two HARQ-ACK messages may have the same or different maximum encoding rates.

Similarly, in this embodiment, the feedback is provided in units of one slot for illustration. In other embodiments, the base station 2 may also instruct the user equipment 1 to provide feedback in units of one sub-slot. How the user equipment 1 provides feedback in units of a sub-slot shall be appreciated by those of ordinary skill in the art based on the above description, and thus will not be further described herein.

A twelfth embodiment of the present invention is as shown in FIG. 8A to FIG. 8D.

Different from the eleventh embodiment, the base station 2 in this embodiment instructs, in advance through the RRC message (without being limited thereto), the user equipment 1 to feed back the activated SPS HARQ-ACK bits of the activated SPS PDSCH resources and the HARQ-ACK bits of the dynamically scheduled PDSCH resources indicated by the DCI in the same slot together in the same codebook, and to feed back the SPS HARQ-ACK bits of the SPS PDSCH resources together in the same codebook.

Figure 8A:
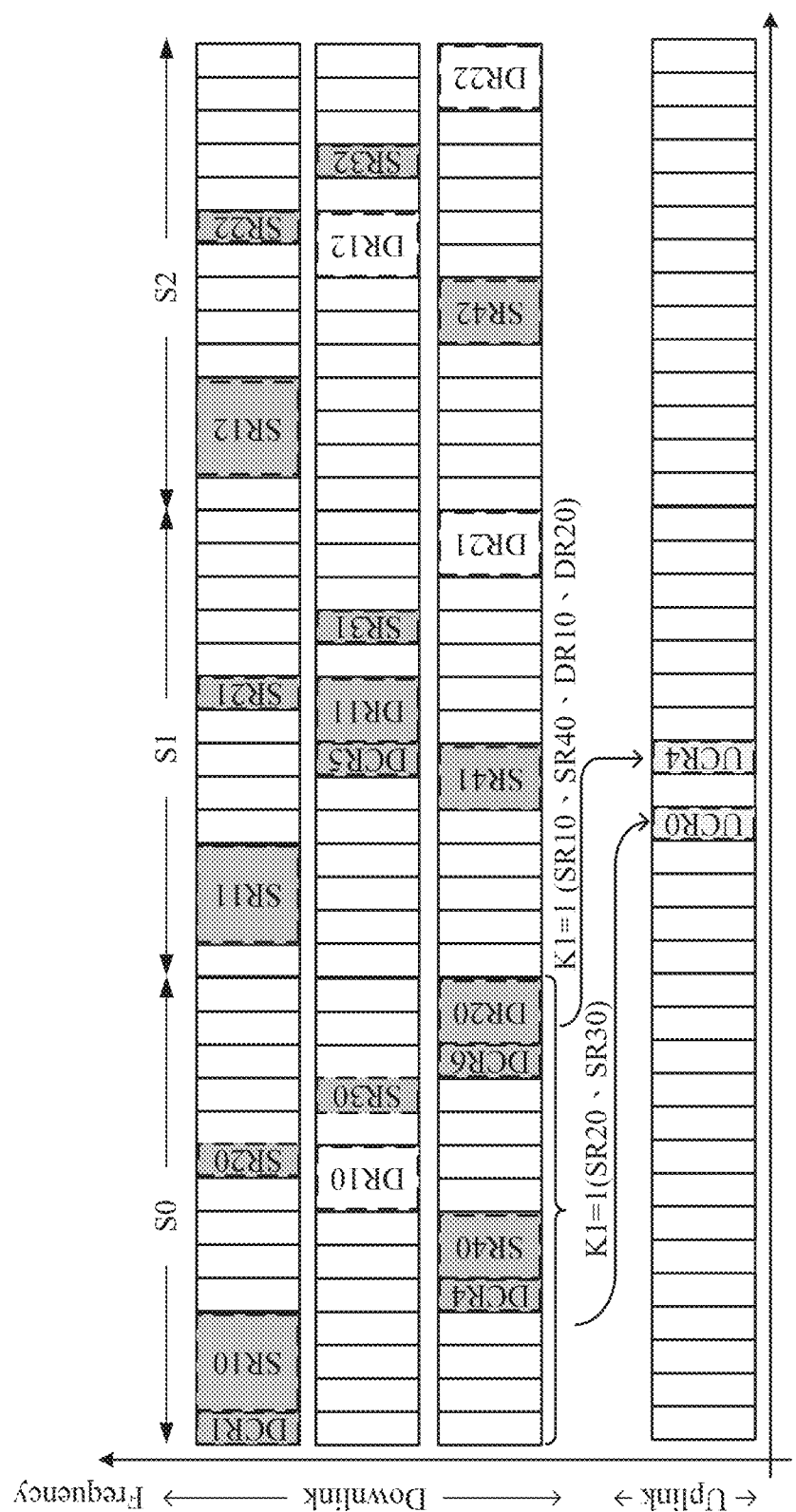
FIG. 8A depicts an implementation scenario of SPS PDSCH resource and dynamically scheduled PDSCH resource configuration in a sub-slot of the present invention.
Figure 8B:
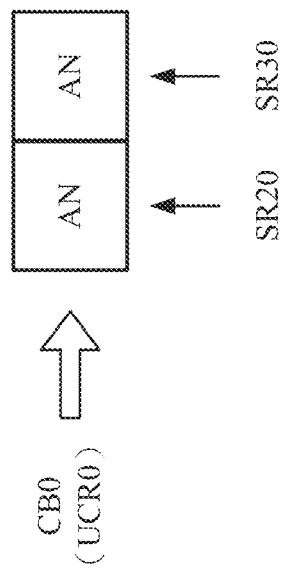
FIG. 8B depicts a codebook transmitted on the PUCCH resource UCR0 of the present invention.

Please refer to FIG. 8A. In the slot S0, the SPS PDSCH resources configured by the base station 2 include the SPS PDSCH resources SR10, SR20, SR30, SR40 and the dynamically scheduled PDSCH resources DR10, DR20. Therefore, the order of the HARQ-ACK bits of the SPS PDSCH resources SR20, SR30 of the slot S0 in the codebook CB0 may be as shown in FIG. 8B. At the same time, according to the total number of SPS HARQ-ACK bits, the user equipment 1 may select the PUCCH resource UCR0 to transmit the HARQ-ACK message including the codebook CB0.

Figure 8C:
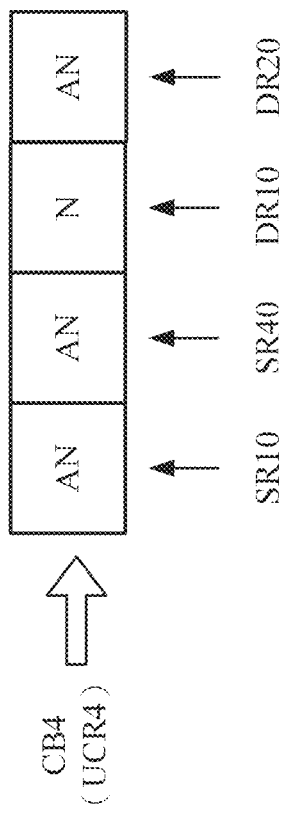
FIG. 8C depicts a codebook of a semi-static codebook type transmitted on the PUCCH resource UCR4 of the present invention.
Figure 8D:
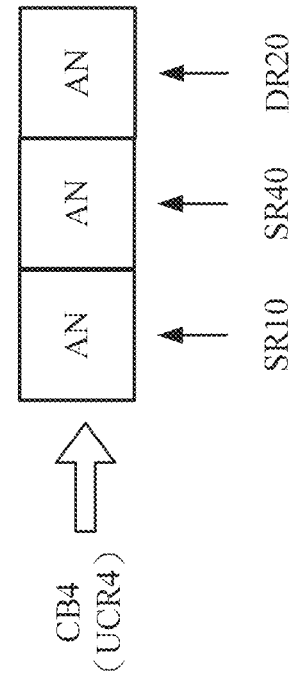
FIG. 8D depicts a codebook of a dynamic codebook type transmitted on the PUCCH resource UCR4 of the present invention.

Furthermore, for the dynamically scheduled PDSCH resources DR10, DR20 and the activated SPS PDSCH resources SR10, SR40 in the slot S0, if the base station 2 instructs the user equipment 1 to use the semi-static codebook type, then the order of the HARQ-ACK bits of the activated SPS PDSCH resources SR10, SR40 and the HARQ-ACK bits of the dynamically scheduled PDSCH resources DR10, DR20 of the slot S0 in the codebook CB4 may be as shown in FIG. 8C. Furthermore, if the base station 2 instructs the user equipment 1 to use the dynamic codebook type, then the HARQ-ACK bits of the activated SPS PDSCH resources SR10, SR40 and the HARQ-ACK bits of the dynamically scheduled PDSCH resources DR20 of the slot S0 may be as shown in FIG. 8D. Finally, the user equipment 1 generates another HARQ-ACK message including the codebook CB4 according to the HARQ-ACK bit order, and transmits another HARQ-ACK message on the PUCCH resource UCR4 to the base station 2. Similarly, the another HARQ-ACK message including the codebook CB4 and the HARQ-ACK message including the codebook CB0 may be encoded at the same or different encoding rates, i.e., the PUCCH formats of the PUCCH resources used by the two HARQ-ACK messages may have the same or different maximum encoding rates.

Figure 9:
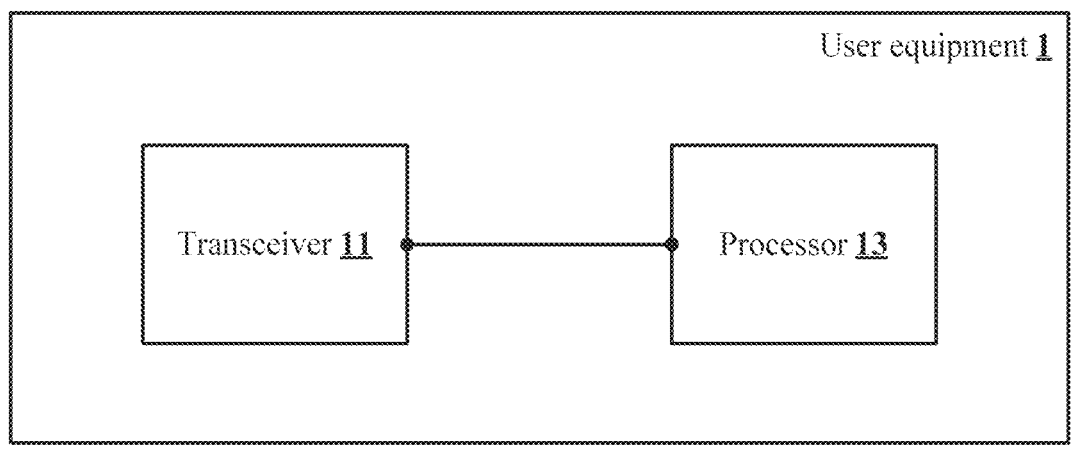
FIG. 9 is a schematic view of a user equipment 1 of the present invention.

A thirteenth embodiment of the present invention is as shown in FIG. 9, which is a schematic view of the user equipment 1 of the present invention. The user equipment 1 comprises a transceiver 11 and a processor 13. The processor 13 is electrically connected to the transceiver 11. Based on the principle of simplification of explanation, other elements of the user equipment 1, e.g., elements less relevant to the present invention such as a storage, a housing, a power module or the like, are omitted from depiction in the figure. The processor 13 may be one of various processors, central processing units, microprocessors, digital signal processors, or other computing devices known to those of ordinary skill in the art.

Corresponding to the first embodiment and the fourth embodiment, the processor 13 monitors a plurality of Semi-Persistent Scheduling (SPS) Physical Downlink Shared Channel (PDSCH) resources through the transceiver 11. Each of the SPS PDSCH resources is not a periodic resource indicated by a piece of downlink control information (DCI), and each of the SPS PDSCH resources is defined by at least one set of resource configuration parameters. The processor 13 determines an SPS HARQ-ACK bit order of a plurality of SPS HARQ-ACK bits, corresponding to the SPS PDSCH resources, in a codebook according to a time-domain position, a component carrier (CC) index, and a configuration index corresponding to each of the SPS PDSCH resources. Each of the SPS HARQ-ACK bits is configured to indicate downlink reception correctness on the corresponding SPS PDSCH resource. The processor 13 generates an HARQ-ACK message comprising the codebook according to the SPS HARQ-ACK bit order, and transmits through the transceiver 11 the HARQ-ACK message on a Physical Uplink Control Channel (PUCCH) resource to a base station.

Corresponding to the second embodiment, the processor 13 monitors a plurality of activated SPS PDSCH resources through the transceiver 11, calculates a total number of HARQ-ACK bits corresponding to the SPS PDSCH resources, and selects the PUCCH resource from a plurality of candidate PUCCH resources in a target slot according to the total number of HARQ-ACK bits. Each of the activated SPS PDSCH resources is indicated by a piece of DCI, each of the pieces of DCI carries an HARQ feedback timing indicator, and a value of each of the HARQ feedback timing indicators maps the SPS PDSCH resource to the target slot. A PUCCH format of each of the candidate PUCCH resources has the same or different maximum encoding rates.

Corresponding to the fifth embodiment, the processor 13 monitors a plurality of activated SPS PDSCH resources through the transceiver 11, calculates a total number of HARQ-ACK bits corresponding to the SPS PDSCH resources, and selects the PUCCH resource from a plurality of candidate PUCCH resources in a target sub-slot according to the total number of HARQ-ACK bits. Each of the activated SPS PDSCH resources is indicated by a piece of DCI, each of the pieces of DCI carries an HARQ feedback timing indicator, and a value of each of the HARQ feedback timing indicators maps the SPS PDSCH resource to the target sub-slot. A PUCCH format of each of the candidate PUCCH resources has the same or different maximum encoding rates.

Corresponding to the third embodiment and the sixth embodiment, the processor 13 receives, through the transceiver 11, a piece of DCI indicating release of an SPS PDSCH resource of a target configuration index from a physical downlink control channel (PDCCH) resource, determines an HARQ-ACK bit order of a released HARQ-ACK bit, corresponding to the PDCCH resource, in the codebook according to a time-domain position and a CC index of the PDCCH resource, wherein the released HARQ-ACK bit is configured to indicate downlink reception correctness on the PDCCH resource. Finally, the processor 13 generates the HARQ-ACK message comprising the codebook according to the SPS HARQ-ACK bit order and the HARQ-ACK bit order.

Corresponding to the seventh embodiment, the processor 13 monitors a plurality of PDSCH resources through the transceiver 11, wherein the PDSCH resources comprise a plurality of dynamically scheduled PDSCH resources and a plurality of activated SPS PDSCH resources. The processor 13 determines an HARQ-ACK bit order of a plurality of HARQ-ACK bits, corresponding to the PDSCH resources, in the codebook according to a time-domain position and a CC index of each of the PDSCH resources. Each of the HARQ-ACK bits is configured to indicate downlink reception correctness on the corresponding PDSCH resource. Finally, the processor 13 generates the HARQ-ACK message comprising the codebook according to the SPS HARQ-ACK bit order and the HARQ-ACK bit order. The codebook belongs to one of a semi-static codebook type and a dynamic codebook type.

In other embodiments, each of the PDSCH resources carrying an uplink data signal is indicated by a piece of DCI. Each of the pieces of DCI carries an HARQ feedback timing indicator. A value of each of the HARQ feedback timing indicators maps the corresponding PUCCH resource to a target slot.

In other embodiments, the DCI corresponding to a last dynamically scheduled PDSCH resource, which carries the uplink data signal among the PDSCH resources, carries a PUCCH resource indicator (PRI), and the PRI is used to indicate a location of the PUCCH resource in a PUCCH resource set in the target slot.

In other embodiments, a value of each of the HARQ feedback timing indicators maps the corresponding PUCCH resource to a target sub-slot of a plurality of sub-slots in a slot. Moreover, the DCI corresponding to a last dynamically scheduled PDSCH resource, which carries the uplink data signal among the PDSCH resources, carries a PRI, and the PRI is used to indicate a location of the PUCCH resource in a PUCCH resource set in the target sub-slot, as described in the eighth embodiment.

In other embodiments, the SPS PDSCH resources corresponding to the codebook are within a feedback periodic interval in a time domain, as described in the ninth embodiment and the tenth embodiment.

Corresponding to the eleventh embodiment, the processor 13 monitors a plurality of PDSCH resources through the transceiver 11. The PDSCH resources comprise a plurality of dynamically scheduled PDSCH resources and a plurality of activated SPS PDSCH resources. The processor 13 determines an activated SPS HARQ-ACK bit order of a plurality of activated SPS HARQ-ACK bits, corresponding to the activated SPS PDSCH resources, in the codebook according to a time-domain position and a CC index of each of the activated SPS PDSCH resources, and generates the HARQ-ACK message comprising the codebook according to the activated SPS HARQ-ACK bit order and the SPS HARQ-ACK bit order. Each of the activated SPS HARQ-ACK bits is configured to indicate downlink reception correctness on the corresponding activated SPS PDSCH resource.

Moreover, the processor 13 determines an HARQ-ACK bit order of a plurality of HARQ-ACK bits, corresponding to the dynamically scheduled PDSCH resources, in another codebook according to a time-domain position and a CC index of each of the dynamically scheduled PDSCH resources, and generates another HARQ-ACK message comprising the another codebook according to the HARQ-ACK bit order. Each of the HARQ-ACK bits is configured to indicate downlink reception correctness on the corresponding PDSCH resource. Finally, the processor 13 transmits, through the transceiver 11, the another HARQ-ACK message on another PUCCH resource to the base station 2. In an embodiment, the HARQ-ACK message and the another HARQ-ACK message are encoded at different encoding rates.

Corresponding to the twelfth embodiment, the processor 13 monitors a plurality of PDSCH resources through the transceiver 11, wherein the PDSCH resources comprise a plurality of dynamically scheduled PDSCH resources and a plurality of activated SPS PDSCH resources. Next, the processor 13 determines an HARQ-ACK bit order of a plurality of HARQ-ACK bits, corresponding to the PDSCH resources, in another codebook according to a time-domain position and a CC index of each of the PDSCH resources. Each of the HARQ-ACK bits is configured to indicate downlink reception correctness on the corresponding PDSCH resource. Finally, the processor 13 generates another HARQ-ACK message comprising the another codebook according to the HARQ-ACK bit order, and transmits, through the transceiver 11, the another HARQ-ACK message on another PUCCH resource to the base station 2. In an embodiment, the HARQ-ACK message and the another HARQ-ACK message are encoded at different encoding rates.

Figure 10:
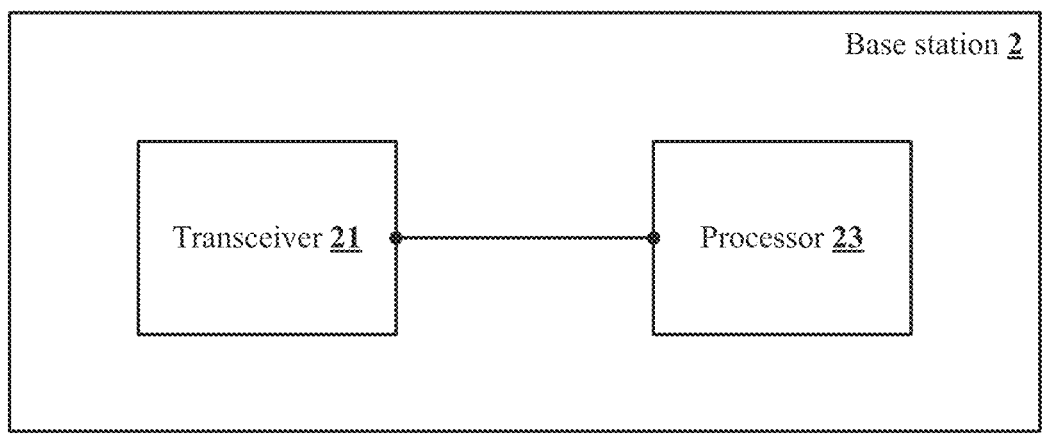
FIG. 10 is a schematic view of a base station 2 of the present invention.

A fourteenth embodiment of the present invention is as shown in FIG. 10, which is a schematic view of the base station 2 of the present invention. The base station 2 is usually called a "gNB" in the 5G mobile communication system. The base station 2 comprises a transceiver 21 and a processor 23. The processor 23 is electrically connected to the transceiver 21. Based on the principle of simplification of explanation, other elements of the base station 2, e.g., elements less relevant to the present invention such as a storage, a housing, a power module or the like, are omitted from depiction in the figure. The processor 23 may be one of various processors, central processing units, microprocessors, digital signal processors, or other computing devices known to those of ordinary skill in the art.

Corresponding to the first embodiment, the processor 23 transmits a plurality of downlink data signals on a plurality of SPS PDSCH resources through the transceiver 21. Each of the SPS PDSCH resources is not a periodic resource indicated by a piece of DCI, and each of the SPS PDSCH resources is defined by at least one set of resource configuration parameters. The processor 23 receives, through the transceiver 21, an HARQ-ACK message on a PUCCH resource from the user equipment 1, and the HARQ-ACK message comprises a codebook. The codebook is generated by the user equipment according to an SPS HARQ-ACK bit order of a plurality of SPS HARQ-ACK bits in a codebook. The SPS HARQ-ACK bit order is determined by the user equipment 1 according to a time-domain position, a component carrier (CC) index, and a configuration index corresponding to each of the SPS PDSCH resources. Each of the HARQ-ACK bits is configured to indicate downlink reception correctness on the corresponding PDSCH resource.

The processor 23 transmits a radio resource control (RRC) message through the transceiver, and the RRC message indicates a plurality of available PUCCH resources to enable the user equipment 1 to select the PUCCH resource from the available PUCCH resources according to a total number of HARQ-ACK bits corresponding to the SPS PDSCH resources, as described in the second embodiment.

In other embodiments, the RRC message indicates a feedback periodic length. The SPS PDSCH resources corresponding to the codebook are within a feedback periodic interval in a time domain. A time length of the feedback periodic interval is equal to the feedback periodic length.

According to the above descriptions, the user equipment of the present invention determines an SPS HARQ-ACK bit order of SPS HARQ-ACK bit values, corresponding to the SPS PDSCH resources, in a codebook according to a time-domain position, a component carrier (CC) index, and a configuration index corresponding to each of the SPS PDSCH resources, and determines an HARQ-ACK bit order of the HARQ-ACK bits of the dynamically scheduled PDSCH resources in a codebook according to the time-domain position and the component carrier index of the dynamically scheduled PDSCH resources. Accordingly, the user equipment can feed the corresponding downlink reception correctness back to the base station for the downlink data signals on the SPS PDSCH resources and the dynamically scheduled PDSCH resources.

The above disclosure is only utilized to enumerate some embodiments of the present invention and illustrated technical features thereof, which is not used to limit the scope of the present invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A user equipment for a mobile communication system, comprising:
  a transceiver; and
  a processor, being electrically connected to the transceiver, and being configured to perform the following operations:

monitoring a plurality of Semi-Persistent Scheduling (SPS) Physical Downlink Shared Channel (PDSCH) resources through the transceiver, wherein each of the SPS PDSCH resources is not a periodic resource indicated by a piece of downlink control information (DCI), and each of the SPS PDSCH resources is defined by at least one set of resource configuration parameters;

determining an SPS Hybrid Automatic Repeat reQuest acknowledge (HARQ-ACK) bit order of a plurality of SPS HARQ-ACK bits, corresponding to the SPS PDSCH resources, in a codebook according to a time-domain position, a component carrier (CC) index and a configuration index corresponding to each of the SPS PDSCH resources, wherein each of the SPS HARQ-ACK bits is configured to indicate downlink reception correctness on the corresponding SPS PDSCH resource;

generating an HARQ-ACK message comprising the codebook according to the SPS HARQ-ACK bit order;

transmitting, through the transceiver, the HARQ-ACK message on a Physical Uplink Control Channel (PUCCH) resource to a base station;

monitoring a plurality of activated SPS PDSCH resources through the transceiver, wherein each of the activated SPS PDSCH resources is indicated by a piece of DCI, each of the pieces of DCI carries an HARQ feedback timing indicator, and a value of each of the HARQ feedback timing indicators maps the activated SPS PDSCH resource to a target slot or a target sub-slot; and calculating a total number of HARQ-ACK bits corresponding to the SPS PDSCH resources, and selecting the PUCCH resource from a plurality of candidate PUCCH resources in the target slot or the target sub-slot according to the total number of HARQ-ACK bits.

2. The user equipment of claim 1, wherein a PUCCH format of each of the candidate PUCCH resources has the same or different maximum encoding rates.

3. The user equipment of claim 1, wherein the processor further performs the following operations:

receiving, through the transceiver, a piece of DCI indicating release of an SPS PDSCH resource of a target configuration index from a physical downlink control channel (PDCCH) resource;

determining an HARQ-ACK bit order of a released HARQ-ACK bit, corresponding to the PDCCH resource, in the codebook according to a time-domain position and a CC index of the PDCCH resource, wherein the released HARQ-ACK bit is configured to indicate downlink reception correctness on the PDCCH resource; and generating the HARQ-ACK message comprising the codebook according to the SPS HARQ-ACK bit order and the HARQ-ACK bit order.

4. A user equipment for a mobile communication system, comprising:

a transceiver; and a processor, being electrically connected to the transceiver, and being configured to perform the following operations:

monitoring a plurality of SPS PDSCH resources through the transceiver, wherein each of the SPS PDSCH resources is not a periodic resource indicated by a piece of DCI, and each of the SPS PDSCH resources is defined by at least one set of resource configuration parameters;

determining an SPS HARQ-ACK bit order of a plurality of SPS HARQ-ACK bits, corresponding to the SPS PDSCH resources, in a codebook according to a time-domain position, a CC index and a configuration index corresponding to each of the SPS PDSCH resources, wherein each of the SPS HARQ-ACK bits is configured to indicate downlink reception correctness on the corresponding SPS PDSCH resource;

generating an HARQ-ACK message comprising the codebook according to the SPS HARQ-ACK bit order;

monitoring a plurality of PDSCH resources through the transceiver, wherein the PDSCH resources comprise a plurality of dynamically scheduled PDSCH resources and a plurality of activated SPS PDSCH resources;

determining an HARQ-ACK bit order of a plurality of HARQ-ACK bits, corresponding to the PDSCH resources, in the codebook according to a time-domain position and a CC index of each of the PDSCH resources, wherein each of the HARQ-ACK bits is configured to indicate downlink reception correctness on the corresponding PDSCH resource;

generating the HARQ-ACK message comprising the codebook according to the SPS HARQ-ACK bit order and the HARQ-ACK bit order; and transmitting, through the transceiver, the HARQ-ACK message on a PUCCH resource to a base station.

5. The user equipment of claim 4, wherein each of the PDSCH resources carrying an uplink data signal is indicated by a piece of DCI, each of the pieces of DCI carries an HARQ feedback timing indicator, a value of each of the HARQ feedback timing indicators maps the corresponding PUCCH resource to a target slot.

6. The user equipment of claim 5, wherein the DCI corresponding to a last dynamically scheduled PDSCH resource, which carries the uplink data signal among the PDSCH resources, carries a PUCCH resource indicator (PRI), and the PRI is configured to indicate a location of the PUCCH resource in a PUCCH resource set in the target slot.

7. The user equipment of claim 4, wherein each of the PDSCH resources carrying an uplink data signal is indicated by a piece of DCI, each of the pieces of DCI carries an HARQ feedback timing indicator, a value of each of the HARQ feedback timing indicators maps the corresponding PUCCH resource to a target sub-slot of a plurality of sub-slots in a slot.

8. The user equipment of claim 7, wherein the DCI corresponding to a last dynamically scheduled PDSCH resource, which carries the uplink data signal among the PDSCH resources, carries a PUCCH resource indicator (PRI), and the PRI is configured to indicate a location of the PUCCH resource in a PUCCH resource set in the target sub-slot.

9. The user equipment of claim 4, wherein the codebook belongs to one of a semi-static codebook type and a dynamic codebook type.

10. The user equipment of claim 1, wherein the SPS PDSCH resources corresponding to the codebook are within a feedback periodic interval in a time domain.

11. The user equipment of claim 1, wherein the processor is further configured to perform the following operations:

monitoring a plurality of PDSCH resources through the transceiver, wherein the PDSCH resources comprise a plurality of dynamically scheduled PDSCH resources;

determining an activated SPS HARQ-ACK bit order of a plurality of activated SPS HARQ-ACK bits, corresponding to the activated SPS PDSCH resources, in the codebook according to a time-domain position and a CC index of each of the activated SPS PDSCH resources, wherein each of the activated SPS HARQ-ACK bits is configured to indicate downlink reception correctness on the corresponding activated SPS PDSCH resource;

generating the HARQ-ACK message comprising the codebook according to the activated SPS HARQ-ACK bit order and the SPS HARQ-ACK bit order; and determining an HARQ-ACK bit order of a plurality of HARQ-ACK bits, corresponding to the dynamically scheduled PDSCH resources, in another codebook according to a time-domain position and a CC index of each of the dynamically scheduled PDSCH resources, wherein each of the HARQ-ACK bits is configured to indicate downlink reception correctness on the corresponding PDSCH resource;

generating another HARQ-ACK message comprising the another codebook according to the HARQ-ACK bit order; and transmitting, through the transceiver, the another HARQ-ACK message on another PUCCH resource to the base station.

12. The user equipment of claim 11, wherein the HARQ-ACK message and the another HARQ-ACK message are encoded at different encoding rates.

13. The user equipment of claim 1, wherein the processor is further configured to perform the following operations:

monitoring a plurality of PDSCH resources through the transceiver, wherein the PDSCH resources comprise a plurality of dynamically scheduled PDSCH resources;

determining an HARQ-ACK bit order of a plurality of HARQ-ACK bits, corresponding to the PDSCH resources corresponding to dynamically scheduled PDSCH resources and activated SPS PDSCH resources, in another codebook according to a time-domain position and a CC index of each of the PDSCH resources, wherein each of the HARQ-ACK bits is configured to indicate downlink reception correctness on the corresponding PDSCH resource; and generating another HARQ-ACK message comprising the another codebook according to the HARQ-ACK bit order; and transmitting, through the transceiver, the another HARQ-ACK message on another PUCCH resource to the base station.

14. The user equipment of claim 13, wherein the HARQ-ACK message and the another HARQ-ACK message are encoded at different encoding rates.

15. A base station for a mobile communication system, comprising:

a transceiver; and a processor, being electrically connected to the transceiver, and being configured to perform the following operations:

transmitting a plurality of downlink data signals on a plurality of Semi-Persistent Scheduling (SPS) Physical Downlink Shared Channel (PDSCH) resources through the transceiver, each of the SPS PDSCH resources being not a periodic resource indicated by a piece of downlink control information (DCI), and each of the SPS PDSCH resources being defined by at least one set of resource configuration parameters; and receiving, through the transceiver, a Hybrid Automatic Repeat reQuest acknowledge (HARQ-ACK) message on a Physical Uplink Control Channel (PUCCH) resource from a user equipment, the HARQ-ACK message comprising a codebook;

wherein the codebook is generated by the user equipment according to an SPS HARQ-ACK bit order of a plurality of SPS HARQ-ACK bits in a codebook, the SPS HARQ-ACK bit order is determined by the user equipment according to a time-domain position, a component carrier (CC) index and a configuration index corresponding to each of the SPS PDSCH resources, and each of the HARQ-ACK bits is configured to indicate downlink reception correctness on the corresponding PDSCH resource, wherein the processor is further configured to instruct each of a plurality of to-be-activated SPS PDSCH resources to be activated by a piece of DCI and the transceiver is configured to transmit the piece of DCI, wherein each of the pieces of DCI carries an HARQ feedback timing indicator, and a value of each of the HARQ feedback timing indicators maps the activated SPS PDSCH resource to a target slot or a target sub-slot.

16. The base station of claim 15, wherein the processor is further configured to perform the following operations:

transmitting a radio resource control (RRC) message through the transceiver;

wherein the RRC message indicates a plurality of available PUCCH resources to enable the user equipment to select the PUCCH resource from the available PUCCH resources according to a total number of HARQ-ACK bits corresponding to the SPS PDSCH resources.

17. The base station of claim 15, wherein the processor is further configured to perform the following operations:

transmitting an RRC message through the transceiver;

wherein the RRC message indicates a feedback periodic length, the SPS PDSCH resources corresponding to the codebook are within a feedback periodic interval in a time domain, and a time length of the feedback periodic interval is equal to the feedback periodic length.

18. A base station for a mobile communication system, comprising:

a transceiver; and a processor, being electrically connected to the transceiver, and being configured to perform the following operations:

transmitting a plurality of downlink data signals on a plurality of SPS PDSCH resources through the transceiver, each of the SPS PDSCH resources being not a periodic resource indicated by a piece of DCI, and each of the SPS PDSCH resources being defined by at least one set of resource configuration parameters; and receiving, through the transceiver, an HARQ-ACK message on a PUCCH resource from a user equipment, the HARQ-ACK message comprising a codebook;

wherein the codebook is generated by the user equipment according to an SPS HARQ-ACK bit order of a plurality of SPS HARQ-ACK bits in a codebook, the SPS HARQ-ACK bit order is determined by the user equipment according to a time-domain position, a CC index and a configuration index corresponding to each of the SPS PDSCH resources, and each of the HARQ-ACK bits is configured to indicate downlink reception correctness on the corresponding PDSCH resource, wherein the processor is further configured to transmit an activated SPS PDSCH resource to be activated by a first piece of DCI and transmit a dynamically scheduled PDSCH resources to be scheduled by another piece of DCI, and the transceiver is configured to transmit the piece of DCI and the another piece of DCI.

\* \* \* \* \*